United States Patent
Zong et al.

(10) Patent No.: US 10,465,907 B2
(45) Date of Patent: Nov. 5, 2019

(54) SYSTEM AND METHOD HAVING ANNULAR FLOW PATH ARCHITECTURE

(71) Applicant: General Electric Company, Schenectady, NY (US)

(72) Inventors: Nan Zong, West Chester, OH (US); Ahmed Mostafa ELKady, West Chester, OH (US); Mark Anthony Mueller, Cincinnati, OH (US); Pradeep Naik, Bangalore (IN); Gerardo Antonio Salazar Lois, West Chester, OH (US); Rishikesh Prakash Karande, Bangalore (IN); Jeffrey Michael Martini, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 970 days.

(21) Appl. No.: 14/849,552

(22) Filed: Sep. 9, 2015

(65) Prior Publication Data

US 2017/0067635 A1 Mar. 9, 2017

(51) Int. Cl.
*F23R 3/04* (2006.01)
*F23R 3/00* (2006.01)
(Continued)

(52) U.S. Cl.
CPC ............ *F23R 3/002* (2013.01); *F04D 29/542* (2013.01); *F23R 3/04* (2013.01); *F23R 3/10* (2013.01);
(Continued)

(58) Field of Classification Search
CPC .... F23R 3/002; F23R 3/04; F23R 3/10; F23R 3/44; F23R 3/46; F23R 3/50; F23R 3/54; F04D 29/542
See application file for complete search history.

(56) References Cited

U.S. PATENT DOCUMENTS 2,658,338 A * 11/1953 Leduc .................... F02C 3/045
                                                        415/143
3,169,367 A *  2/1965 Hussey ................... F23R 3/04
                                                        60/39.37
(Continued)

FOREIGN PATENT DOCUMENTS

CN        1130741 A       9/1996
CN        1392331 A       1/2003
(Continued)

OTHER PUBLICATIONS

Lefebvre, Arther and Bllal, Dilip; Gas Turbine Combustion Alternative Fuels and Emissions; 2010; CRC Press; Third Edition; p. 12; http://www.crcnetbase.com/isbn/9781420086058.*
(Continued)

*Primary Examiner* — Gerald L Sung
*Assistant Examiner* — Marc J Amar
(74) *Attorney, Agent, or Firm* — Fletcher Yoder, P.C.

(57) ABSTRACT

A system including an annular combustor having a first liner wall disposed circumferentially about an axis, a combustion chamber disposed circumferentially about the first liner wall, and a second liner wall disposed circumferentially about the combustion chamber. The annular combustor is configured to direct a combustion gas flow in a downstream direction through the combustion chamber away from a head end toward a turbine. The system also includes a supply passage configured to supply a fluid flow from a compressor to the combustion chamber. The supply passage has a flow path architecture having a turning portion that turns the fluid flow from a compressor discharge direction to an upstream direction generally opposite the downstream direction of combustion gas flow.

20 Claims, 11 Drawing Sheets

(51) Int. Cl.
*F23R 3/10* (2006.01)
*F23R 3/28* (2006.01)
*F23R 3/44* (2006.01)
*F23R 3/46* (2006.01)
*F04D 29/54* (2006.01)
*F23R 3/50* (2006.01)
*F23R 3/54* (2006.01)

(52) U.S. Cl.
CPC .............. *F23R 3/28* (2013.01); *F23R 3/44* (2013.01); *F23R 3/46* (2013.01); *F23R 3/50* (2013.01); *F23R 3/54* (2013.01); *Y02T 50/675* (2013.01)

(56) References Cited

U.S. PATENT DOCUMENTS

| | | | | |
|---|---|---|---|---|
| 3,623,318 | A * | 11/1971 | Shank | F01D 5/189 415/115 |
| 4,896,510 | A * | 1/1990 | Foltz | F23M 5/085 60/757 |
| 4,912,922 | A * | 4/1990 | Maclin | F23R 3/002 60/757 |
| 5,557,918 | A | 9/1996 | Chyou et al. | |
| 5,566,542 | A * | 10/1996 | Chen | F01K 21/047 60/39.3 |
| 5,645,410 | A | 7/1997 | Brostmeyer | |
| 5,737,915 | A | 4/1998 | Lin et al. | |
| 6,494,044 | B1 | 12/2002 | Bland | |
| 6,672,070 | B2 | 1/2004 | Bland et al. | |
| 7,350,360 | B2 | 4/2008 | Graf et al. | |
| 7,874,138 | B2 | 1/2011 | Rubio et al. | |
| 8,082,738 | B2 | 12/2011 | Cornelius et al. | |
| 8,438,855 | B2 | 5/2013 | Schott | |
| 8,479,519 | B2 | 7/2013 | Chen et al. | |
| 9,212,823 | B2 | 12/2015 | Boardman et al. | |
| 9,376,961 | B2 | 6/2016 | Stoia et al. | |
| 2004/0250548 | A1* | 12/2004 | Howell | F23R 3/002 60/796 |
| 2004/0250549 | A1* | 12/2004 | Liebe | F23R 3/002 60/804 |
| 2004/0261419 | A1* | 12/2004 | McCaffrey | F23M 5/04 60/796 |
| 2006/0283189 | A1* | 12/2006 | Lipinski | F23R 3/04 60/772 |
| 2007/0180827 | A1* | 8/2007 | Dawson | F01D 9/023 60/752 |
| 2008/0268387 | A1* | 10/2008 | Saito | F23R 3/286 431/8 |
| 2009/0133401 | A1* | 5/2009 | Suciu | F02C 3/073 60/734 |
| 2009/0217672 | A1 | 9/2009 | Bulat et al. | |
| 2009/0314000 | A1* | 12/2009 | Evulet | F23D 14/62 60/772 |
| 2010/0037620 | A1* | 2/2010 | Chila | F23R 3/06 60/752 |
| 2011/0203287 | A1* | 8/2011 | Chila | F02K 1/82 60/758 |
| 2011/0239619 | A1* | 10/2011 | Omae | F02C 7/222 60/39.08 |
| 2012/0198855 | A1* | 8/2012 | Cihlar | F01D 9/023 60/760 |
| 2012/0234012 | A1 | 9/2012 | Brown et al. | |
| 2012/0247111 | A1* | 10/2012 | Narcus | F23R 3/002 60/752 |
| 2013/0298561 | A1* | 11/2013 | Hughes | F23R 3/286 60/737 |
| 2014/0182301 | A1* | 7/2014 | Fadde | F02C 3/34 60/783 |
| 2017/0067639 | A1 | 3/2017 | Zong et al. | |
| 2017/0175636 | A1* | 6/2017 | Hughes | F02C 3/04 |

FOREIGN PATENT DOCUMENTS

| | | | |
|---|---|---|---|
| CN | 101634313 A | | 1/2010 |
| CN | 103672964 A | | 3/2014 |
| CN | 204063127 U | | 12/2014 |
| EP | 0402693 A1 | | 12/1990 |
| EP | 1 507 120 A1 | | 2/2005 |
| EP | 1507120 A1 * | | 2/2005 ............. F23R 3/14 |
| GB | 586556 A * | | 3/1947 ............. F02C 3/145 |
| JP | H08-219445 A | | 8/1996 |
| JP | H09-196379 A | | 7/1997 |
| WO | 2004068035 A2 | | 8/2004 |

OTHER PUBLICATIONS

Extended European Search Report and Opinion issued in connection with corresponding EP Application No. 16187451.6 dated Jun. 12, 2017.

Notification of Reasons for Refusal issued in connection with corresponding JP Application No. 2016-168700 dated Aug. 29, 2017.

Decision to Grant issued in connection with corresponding JP Application No. 2016-168700 dated Dec. 5, 2017.

Chinese Office Action for CN Application No. 201610812335.2 dated Aug. 21, 2018; 10 pgs.

* cited by examiner

SYSTEM AND METHOD HAVING ANNULAR FLOW PATH ARCHITECTURE

BACKGROUND OF THE INVENTION

The subject matter disclosed herein relates to gas turbine systems, and more particularly, to an annular combustor flow path architecture system.

Gas turbine systems generally include a gas turbine engine having a compressor section, a combustor section, and a turbine section. The combustor section receives and combusts a fuel with an oxidant (e.g., air) to generate hot combustion gases, which flow into and drive one or more turbine stages in the turbine section. Unfortunately, the flow path of the oxidant, the fuel, and/or a mixture of the oxidant and fuel may incur pressure loses due to turning, separation, and cross-sectional flow area changes along the combustor inlet. These pressure losses may reduce the efficiency of the gas turbine engine.

BRIEF DESCRIPTION OF THE INVENTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system includes an annular combustor having a first liner wall disposed circumferentially about an axis, a combustion chamber disposed circumferentially about the first liner wall, and a second liner wall disposed circumferentially about the combustion chamber. The annular combustor is configured to direct a combustion gas flow in a downstream direction through the combustion chamber away from a head end toward a turbine. The system also includes a supply passage configured to supply a fluid flow from a compressor to the combustion chamber. The supply passage has a flow path architecture having a turning portion that turns the fluid flow from a compressor discharge direction to an upstream direction generally opposite the downstream direction of combustion gas flow.

In a second embodiment, a system includes a combustor having a combustion chamber disposed circumferentially about an axis. The combustor is configured to direct a combustion gas flow in a downstream direction through the combustion chamber away from a head end toward a turbine. The system also includes a supply passage configured to supply a fluid flow from a compressor to the combustion chamber. The supply passage has a flow path architecture having a turning portion that turns the fluid flow from a compressor discharge direction to an upstream direction generally opposite the downstream direction of combustion gas flow. Additionally, the system includes at least one of a baffle, a multi-state diffuser, or any combination thereof. The baffle includes a scoop adjacent to a window. The scoop extends into the supply passage, the window is in fluid communication with a first passage disposed along a first liner wall, and the baffle is configured to redirect a portion of the fluid flow through the first passage in the downstream direction. The multi-state diffuser includes a first diffuser positioned upstream of the turning portion and a second diffuser positioned downstream of the turning portion.

In a third embodiment, a method includes routing a combustion gas flow through a combustion chamber of an annular combustor in a downstream direction away from a head end toward a turbine. The method also includes routing a fluid flow from a compressor to the combustion chamber via a supply passage having a flow path architecture with a turning portion. Routing the fluid flow includes turning the fluid flow in the turning portion from a compressor discharge direction to an upstream direction generally opposite the downstream direction of combustion gas flow.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
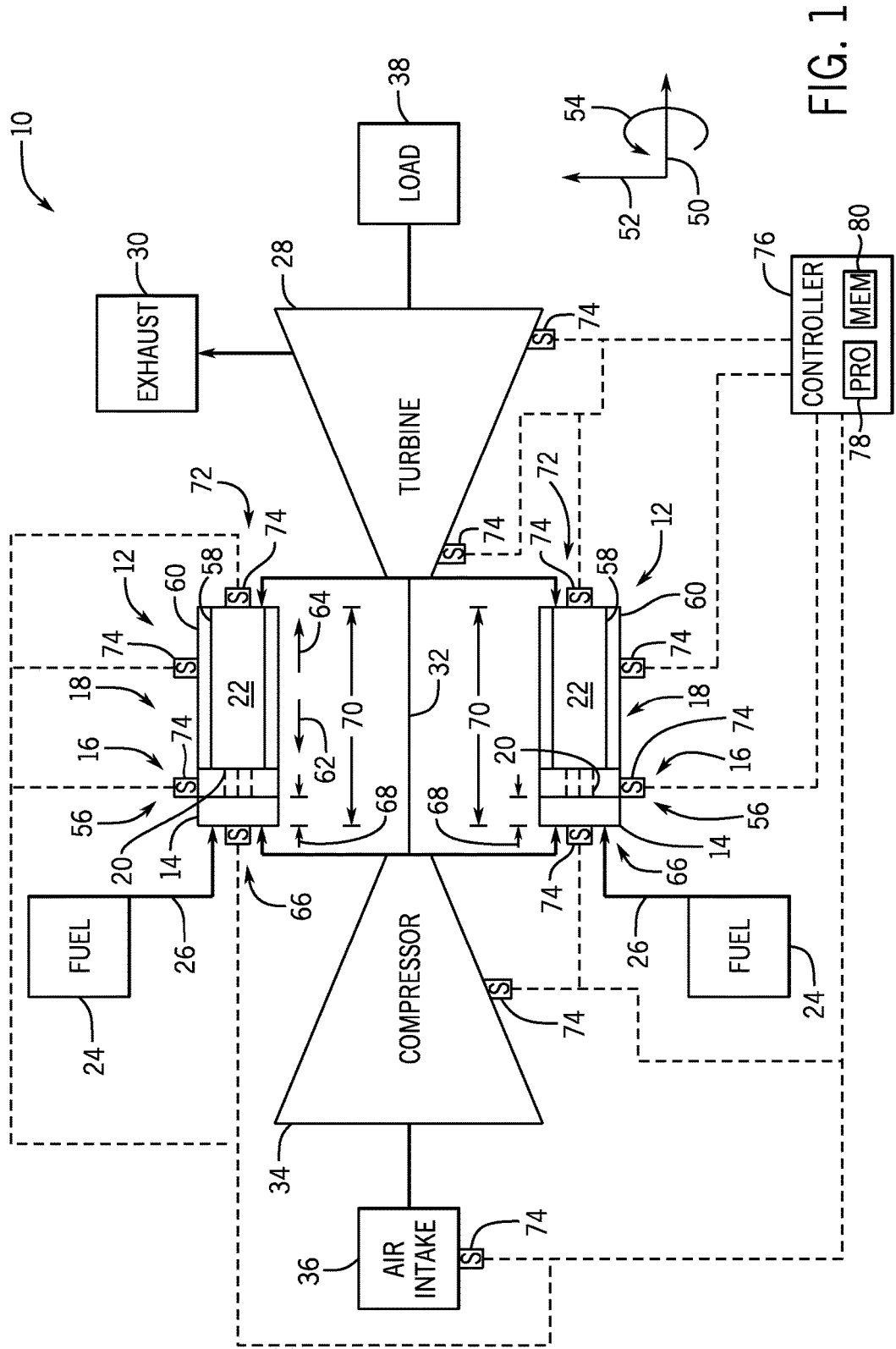
FIG. 1 is a schematic diagram of an embodiment of a gas turbine system having a combustor (e.g., annular combustor) with a flow path architecture system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Furthermore, top, bottom, upward, downward, upper, lower, or the like may be construed as relative terms that relate, in context, to the orientation, position, or location of the various components of the disclosure. Indeed, presently disclosed embodiments may be applicable to any gas turbine system having the same or different configuration and/or orientation described above and in detail below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed toward a flow architecture for directing an air flow to fuel nozzles of a combustor. In certain embodiments, the flow architecture includes a multi-stage diffuser configured to control and/or regulate at least one parameter (e.g., pressure, velocity, flow separation) of the air flow. For example, the multi-stage diffuser may reduce the pressure drop of the air flow, reduce the velocity of the air flow, reduce the possibility of flow dispersion/separation, and/or any combination thereof. In certain embodiments, the multi-stage diffuser may include a gooseneck section having a substantially equal or converging cross-sectional flow area (e.g., a substantially equal circumference along a direction of flow). A first diffuser may direct the air flow toward the gooseneck section. In certain embodiments, the cross-sectional flow area changes along a length of the first diffuser (e.g., the circumference changes along the direction of flow). During operation, the gooseneck section may redirect the air flow and substantially change the direction of the air flow. However, due to the substantially equal cross-sectional flow area, the pressure of the air flow may remain substantially constant. In embodiments where the cross-sectional flow is converging, the pressure of the air flow may be reduced. In certain embodiments, the flow architecture includes a settling chamber downstream of the second diffuser. The settling chamber may be configured to induce mixing of the air flow and/or stabilize the air flow before entering a holder (e.g. axial premixer) and/or a premixer. In certain embodiments, the holder may be positioned within the settling chamber and coupled to the fuel nozzles. For example, the holder may extend from the fuel nozzles to a combustor housing and couple to the combustor housing. Moreover, in certain embodiments, the holder may include aerodynamic stems (e.g., stems with airfoil shaped cross-sections) configured to direct the air flow toward the fuel nozzles and/or premixers. Accordingly, the axial premixer may be utilized in combination with the flow architecture to direct the air flow toward the fuel nozzles and/or premixers while reducing the possibility of pressure drop and/or flow separation.

With the foregoing in mind, FIG. 1 is a schematic diagram of an embodiment of a gas turbine system 10 having one or more combustors 12 (e.g., annular combustors, combustion cans, can-annular combustors) of a combustor section. As discussed below, the combustors 12 may include a flow architecture 14 coupled to a head end section 16 of the combustor 12 to direct an oxidant (e.g., air), a combustible material (e.g., gaseous and/or liquid fuel), and/or a mixture of the oxidant and the combustible material toward a combustion section 18. For example, the flow architecture 14 may include a passage for the oxidant and separate passages for the fuel to facilitate mixing at one or more fuel nozzles 20 (e.g., primary fuel nozzles, one or more quaternary injectors or pegs, and/or one or more late lean injectors) for combustion within the combustion section 18. For example, the oxidant flow path may be upstream of the fuel nozzles 20 while the fuel flow paths direct fuel toward a pre-mixer and/or into the fuel nozzles 20. However in other embodiments, the air/fuel mixture may form in the flow architecture 14, upstream of the fuel nozzles 20. Accordingly, the air/fuel mixture may be directed into a combustion chamber 22 of the combustor 12.

The combustor 12 may represent a single annular combustor, which extends circumferentially around a rotational axis of the turbine system 10. By further example, the combustor 12 may represent a plurality of combustors (e.g., 2, 3, 4, 5, 6, 7, 8, 9, 10, or more) spaced circumferentially about the rotational axis of the turbine system 10. In certain embodiments, any number of combustors 12 (e.g., 1 to 20 or more) may be provided in the turbine system 10. Moreover, in certain embodiments, the combustors 12 may be can-annular combustors representing multiple combustion chambers 22 positioned circumferentially about an axis. That is, each can-annular combustor may include a respective combustion chamber. The following discussion is intended to include any embodiment with a single annular combustor or multiple combustors.

The turbine system 10 may use liquid or gaseous fuel, such as natural gas and/or a synthetic gas, to drive the turbine system 10. In the illustrated embodiment, the one or more fuel nozzles 20 intake a supply of fuel 24 (e.g., a liquid fuel supply, a gaseous fuel supply, a liquid/gas mixture fuel supply). Each of the one or more combustors 12 includes one or more fuel nozzles 20 (e.g., 1, 2, 3, 4, 5, 6, or more). Examples of the fuel 24 include, but are not limited to, hydrocarbon based liquid fuels, such as diesel fuel, jet fuel, gasoline, naphtha, fuel oil, liquefied petroleum gas, and so forth. Moreover, the fuel 24 may include a hydrocarbon based gaseous fuel, such as natural gas, synthetic gas, or the like. In the illustrated embodiment, the turbine system 10 may route the fuel 24 along a fuel path 26 upstream of the fuel nozzles 20. In certain embodiments, the fuel nozzles 20 may include premix fuel nozzles and/or diffusion flame fuel nozzles. For example, the fuel nozzles 20 may premix the fuel 24 with oxidant (e.g., air) to generate a premix flame (e.g., premix within the flow architecture 14, premix upstream of the fuel nozzles 20) and/or separately flow the fuel 24 and oxidant into the combustors 12 to generate a diffusion flame. For example, as described above, the flow architecture 14 may include separate passages to direct the fuel 24 toward the fuel nozzles 20.

The fuel 24 combusts with oxidant (e.g., air) in the combustion chamber 22 within each combustor 12, thereby creating hot pressurized exhaust gases. The combustors 12 direct the exhaust gases through a turbine or turbine section 28 toward an exhaust outlet 30. The turbine section 28 may include one or more turbine stages (e.g., 1, 2, 3, 4, 5, 6, 7, 8, 9, 10, or more), each having a plurality of turbine blades coupled to a turbine rotor and shaft 32. As the exhaust gases pass through the turbine 28, the gases force the turbine blades to rotate the shaft 32 along a rotational axis of the turbine system 10. As illustrated, the shaft 32 is connected to various components of the turbine system 10, including a compressor or compressor section 34. The compressor section 34 may include one or more compressor stages (e.g., 1, 2, 3, 4, 5, 6, 7, 8, 9, 10, or more), each having a plurality of compressor blades coupled to a compressor rotor and shaft (e.g., the shaft 32). As the shaft 32 rotates, the blades within the compressor 34 also rotate, thereby compressing oxidant (e.g., air) from an oxidant intake (e.g., air intake 36) through the compressor 34 and into the fuel nozzles 20 and/or combustors 12. The shaft 32 may also be connected to a load 38, which may be a vehicle or a stationary load, such as an electrical generator in a power plant or a propeller on an aircraft, for example. The load 38 may include any suitable device capable of being powered by the rotational output of the turbine system 10.

In the following discussion, reference may be made to an axial direction or axis 50 (e.g., a longitudinal axis) of the combustor 12, a radial direction or axis 52 that extends radially relative to the axis 50 of the combustor 12, and a circumferential direction or axis 54 that extends circumferentially about the axis 50 of the combustor 12. As discussed in detail below, in certain embodiments, the one or more combustors 12 may be canted or angled relative to the longitudinal axis 50. For example, with a single annular combustor 12 or a plurality of can-annular combustors 12, a longitudinal axis of each combustor 12 may be positioned at an angle with respect to the longitudinal axis 50. Positioning the combustor 12 at an angle may increase the residence time of the air/fuel mixture within the combustion chamber 22. Moreover, the longer residence time during combustion may enable the canted can-annular combustor to burn out CO, thereby reducing emissions. As discussed below, the combustor 12 may be coupled to the flow architecture 14 to direct air and/or fuel toward the combustion chamber 22. For example, the flow architecture 14 may be in fluid communication with a head end chamber 56 (e.g., annular head end chamber) and a compressor discharge chamber from the compressor 34, thereby routing a compressed gas flow (e.g., compressed oxidant such as air) through the flow architecture 14 along the combustor 12 (e.g., for cooling purposes), through a head end chamber 56, and into the combustion chamber 22 (e.g., through the fuel nozzles 20) for purposes of combustion. In certain embodiments, the fluid flow through the flow architecture 14 and the head end chamber 56 (e.g., upstream of the fuel nozzles 16) may include or exclude any one or more of an oxidant (e.g., air, oxygen, oxygen-enriched air, oxygen-reduced air, etc.), exhaust gas recirculation (EGR) gas, steam, inert gas (e.g., nitrogen), and/or some amount of fuel (e.g., secondary fuel injection upstream of fuel nozzles 20).

In embodiments where the one or more combustors 12 are can-annular combustors, the flow architecture 14 may be disposed circumferentially about at least one wall defining a boundary of the combustor 12, such as a first wall 58 (e.g., a combustion liner, an annular first wall) disposed circumferentially about the combustion chamber 22 and/or at least a portion of the head end chamber 56. The flow architecture 14 also may be bounded by a second wall 60 (e.g., a flow sleeve, an annular second wall) disposed circumferentially about the first wall 58. The second wall 60 also may be disposed circumferentially about the head end chamber 56 of the head end section 16.

However, in embodiments where the one or more combustors 12 are annular combustors, an inner first wall 58a (e.g., an inner annular first wall) and an outer first wall 58b (e.g., an outer annular first wall) may be disposed circumferentially about the combustion chamber 22 and/or at least a portion of the head chamber 56. Moreover, an inner second wall 60a (e.g., an inner annular second wall) and an outer second wall 60b (e.g., an outer annular second wall) may be disposed circumferentially about the inner first wall 58a and the outer first wall 58b. As a result, the flow architecture 14 may be disposed circumferentially about at least one wall (e.g., the inner first wall 58a, the outer first wall 58b, the inner second wall 60a, the inner second wall 60b) defining a boundary of the combustor 12.

For example, in the illustrated embodiment, the combustor 12 is an annular combustor extending circumferentially about the rotational axis 50 of the turbine system 10, and thus each of the illustrated structures of the combustor 12 may have an annular shape relative to the axis 50. For example, the head end chamber 56, the wall 58 (e.g., combustion liner), the wall 60 (e.g., flow sleeve), the combustion chamber 22, and other associated structures and flow paths generally extend circumferentially about the rotational axis 50, and may have an annular shape. In the illustrated embodiment, the combustion liner or wall 58 includes an inner wall portion 58a (e.g., inner annular liner) extending circumferentially about the rotational axis 50, and an outer wall portion 58b (e.g., outer annular liner) extending circumferentially about the rotational axis 50, the combustion chamber 22, and the inner wall portion 58a. Likewise, in the illustrated embodiment, the flow sleeve or wall 60 includes an inner wall portion 60a (e.g., inner annular flow sleeve) extending circumferentially about the rotational axis 50, and an outer wall portion 60b (e.g., outer annular flow sleeve) extending circumferentially about the rotational axis 50, the combustion chamber 22, and the inner wall portion 60a.

In the illustrated embodiment, the flow architecture 14 is coupled to at least one of the walls (e.g., the first wall 58 or the second wall 60) defining the boundary of the combustor 12. For example, the flow architecture 14 is disposed about and/or proximate to the head end chamber 56. However, in other embodiments, the flow architecture 14 may be positioned circumferentially about the combustion section 18. For example, the flow architecture 14 may direct the air from the air intake 36 in an upstream direction 62 opposite a downstream direction of combustion 64 (e.g., a combustion flow path) to facilitate cooling of the combustion section 18. Moreover, in other embodiments, the flow architecture 14 may include ports and/or recesses to direct the air about the first wall 58 and/or the second wall 60 and in the direction of combustion 64, thereby further facilitating cooling of the combustion section 18. Furthermore, the flow architecture 14 is positioned proximate a first axial end 66 (e.g., upstream) of the combustor 12 and may extend a first axial length 68 of a combustor axial length 70 of the combustor 12 toward a second axial end 72 (e.g., downstream).

The turbine system 10 also may have a variety of monitoring and control equipment associated with the combustor 12, the flow architecture 14, or the like. In the illustrated embodiment, the turbine system 10 may include one or more sensors 74 to monitor the combustion process, oxidant flow, fuel flow, turbine speed, compressor feed, combustor temperature, combustion dynamics, acoustic noise, vibration, gas composition, and/or exhaust emission (e.g., carbon oxides such as carbon monoxide (CO), nitrogen oxides (NOx), sulfur oxides (SOx), unburn fuel, residual oxygen, etc.) or a variety of other parameters of operation of the turbine system 10. The sensors 74 may be configured to send signals to a controller 76 (e.g., an electronic controller). In the illustrated embodiment, the controller 76 includes a memory 78 and a processor 80. The memory 78 may be a mass storage device, a FLASH memory device, removable memory, or any other non-transitory computer-readable medium (e.g., not only a signal). Additionally and/or alternatively, the instructions may be stored in an additional suitable article of manufacture that includes at least one tangible, non-transitory computer-readable medium that at least collectively stores these instructions or routines in a manner similar to the memory 78 as described above. The controller 76 may be configured to receive signals from the sensors 74 indicative of operating parameters of the gas turbine system 10 (e.g., temperature, pressure, fuel/air ratio, acoustics, vibration). The signals may be evaluated by the processor 80 utilizing instructions stored on the memory 78.

Additionally, the controller 76 may send signals to various components of the gas turbine system 10 (e.g., the air intake 30, the combustor 12, fuel valves, fuel pumps, fuel nozzles, etc.) to adjust operating conditions of the gas turbine system 10 based on the signals received from the sensors 74.

Figure 2:
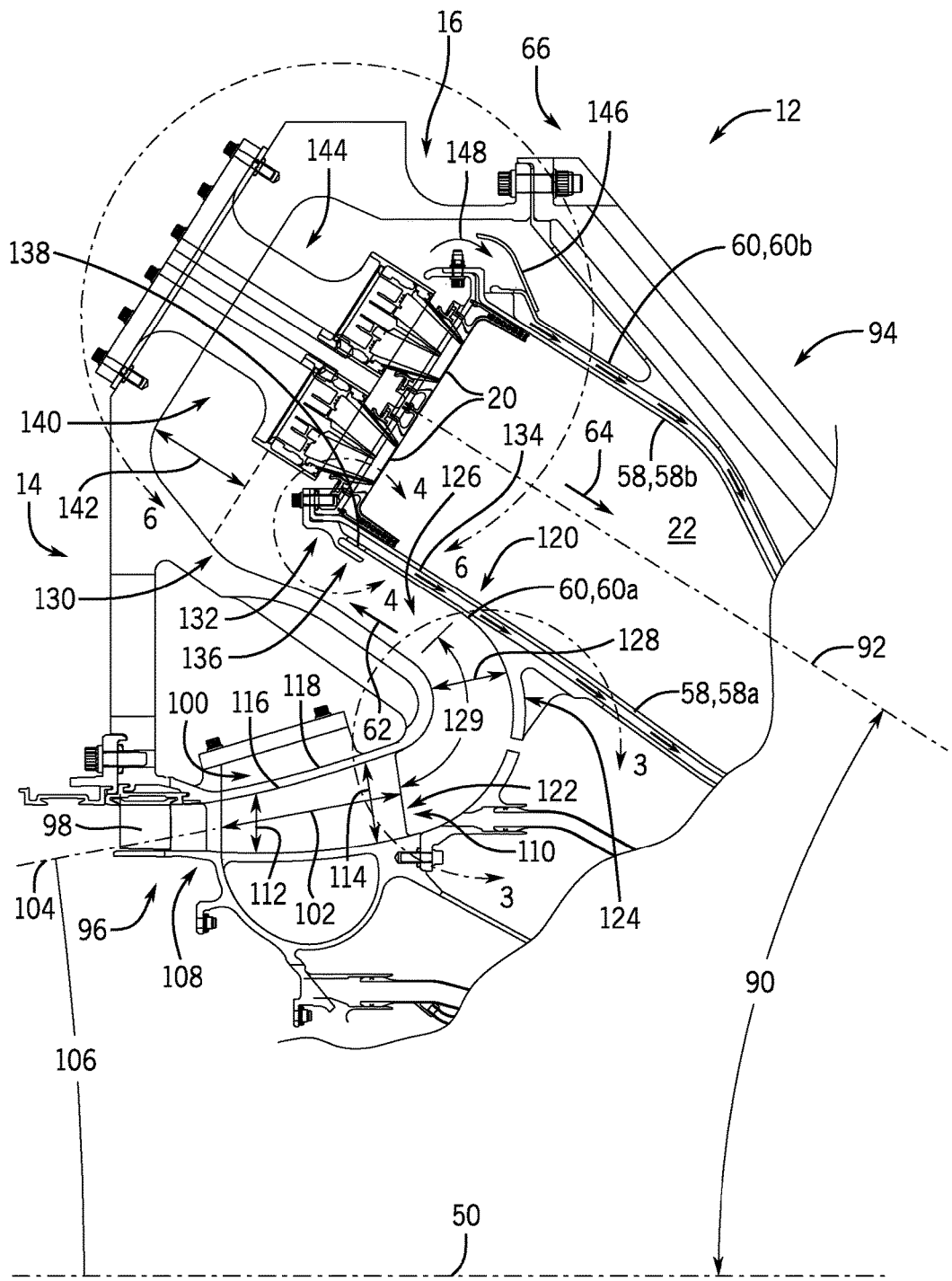
FIG. 2 is a schematic cross-sectional view of an embodiment of a combustor (e.g., annular combustor) fluidly coupled to the flow path architecture system of FIG. 1.

FIG. 2 is a schematic cross-sectional view of an embodiment of the combustor 12 in which the flow architecture 14 is positioned proximate the first axial end 66. As shown, the combustor 12 in the illustrated embodiment is positioned at a first angle 90 between a combustor axis 92 and the longitudinal axis 50. For example, the first angle 90 may be approximately 10 degrees, approximately 20 degrees, approximately 30 degrees, approximately 40 degrees, approximately 50 degrees, approximately 60 degrees, approximately 70 degrees, approximately 80 degrees, or any other reasonable angle. Moreover, the first angle 90 may be between 10 degrees and 30 degrees, between 30 degrees and 50 degrees, between 50 degrees and 70 degrees, or any other reasonable range. In the illustrated embodiment, the first angle 90 is acute. As described above, by positioning the combustor 12 in a canted position 94, the resonance time for combustion may be increased, thereby improving efficiency of the combustor 12 (e.g., increasing and/or improving CO burn out).

In the illustrated embodiment, air from the compressor 34 is directed toward a pre-diffuser 96 (e.g., an annular pre-diffuser). For example, the pre-diffuser 96 includes an inlet port 98 configured to direct the air into a first diffuser 100. In certain embodiments, the first diffuser 100 is formed by a gradually diverging annular passage. That is, the circumference of the first diffuser 100 (e.g., the cross-sectional flow area) may increase in a direction of the air flow. For example, the cross-sectional flow area at an outlet of the first diffuser 100 may be fifty percent larger than the cross-sectional flow area of an inlet of the first diffuser 100, one hundred percent larger than the cross-sectional flow area of an inlet of the first diffuser 100, two hundred percent larger than the cross-sectional flow area of an inlet of the first diffuser 100, or any suitable percentage larger than the cross-sectional flow area of an inlet of the first diffuser 100. As such, the first diffuser 100 may be configured to modify, regulate, and/or control at least one parameter (e.g., pressure, velocity, mixing) of the air entering the pre-diffuser 96. For example, the first diffuser 100 may reduce the velocity of the air flow, reduce the possibility of flow separation, or the like. Additionally, at least a portion of the first diffuser 100 is defined by a first diffuser length 102. In certain embodiments, the first diffuser 100 is canted (e.g., angled) relative to the longitudinal axis 50. That is, a first diffuser axis 104 is positioned at a second angle 106 relative to the longitudinal axis 50. The second angle 106 may be approximately 5 degrees, approximately 10 degrees, approximately 15 degrees, approximately 20 degrees, or any suitable angle. In certain embodiments, positioning the first diffuser 100 at the second angle 106 may decrease the possibility of flow separation. As a result, the at least one parameter of the air flow may be controlled as the air flow is directed to the fuel nozzles 20.

In the illustrated embodiment, the first diffuser 100 includes a first end 108 positioned proximate to the inlet port 98 and a second end 110, opposite the first end 108, along the first diffuser length 102. As shown in FIG. 2, the first end 108 includes a first cross-sectional flow area 112 (e.g., first annular cross-sectional flow area) and the second end 110 includes a second cross-sectional flow area 114 (e.g., second annular cross-sectional flow area). The cross-sectional flow areas 112, 114 may be annular, ovular, polygonal, or the like.

In the illustrated embodiment, the first cross-sectional flow area 112 is smaller than the second cross-sectional flow area 114. As a result, the velocity of the air flow may decrease as the air flow moves along the first diffuser length 102. While first cross-sectional flow area 112 is smaller than the second cross-sectional flow area 114 in the illustrated embodiment, in other embodiments the first cross-sectional flow area 112 may be substantially equal to the second cross-sectional flow area 114. Moreover, while the first diffuser 100 is substantially symmetrical about the first diffuser axis 104 in the illustrated embodiment, in other embodiments the first diffuser 100 may be eccentric about the first diffuser axis 104.

As described above, the flow architecture 14 may be utilized with annular combustors 12. In certain embodiments, the first diffuser 100 may include an inner architecture annular wall 116 (e.g., an inner architecture wall) and an outer architecture annular wall 118 (e.g., an outer architecture wall). The inner architecture annular wall 116 and the outer architecture annular wall 118 may form the annular passage of the first diffuser 100 and direct the air flow toward the combustion chamber 22. Moreover, in certain embodiments, the inner architecture annular wall 116 and the outer architecture annular wall 118 may extend circumferentially about the combustor axis 92. It will be appreciated that the inner architecture annular wall 116 and the outer architecture annular wall 118 may extend along a length of the flow architecture 114 from the inlet port 98 to the fuel nozzles 20.

As the air flow enters the inlet port 98 and flows through the first diffuser 100, the air flow is configured to exit the first diffuser 100 at the second send 110 and enter a gooseneck section 120 (e.g., an annular gooseneck section, a generally turning flow path) at a first gooseneck end 122 positioned proximate and fluidly coupled with the second end 110. As described above, in embodiments where the combustor 12 is an annular combustor 12, the gooseneck section 120 may be formed by the inner architecture wall 116 and the outer architecture wall 118. As shown, a curved portion 124 of the gooseneck section 120 is configured to redirect at least a portion of the air flow in the direction 62 (e.g., substantially opposite the direction of combustion 64) to a second gooseneck end 126. The is, the gooseneck section 120 is configured to change the direction of flow of at least a portion of the air flow approximately 180 degrees, approximately 170 degrees, approximately 160 degrees, approximately 150 degrees, approximately 140 degrees, approximately 130 degrees, approximately 120 degrees, approximately 110 degrees, approximately 100 degrees, approximately 90 degrees, or any other suitable angle. Accordingly, the air flow through the flow architecture 14 may cool the combustion chamber 22 as the air flow is directed toward the fuel nozzles 20, because the gooseneck section 120 directs the air flow along the combustion section 18. In the illustrated embodiment, the curved portion 124 of the gooseneck section 120 has a substantially constant third cross-sectional flow area 128. In other words, the third cross-sectional flow area 128 is substantially constant along a length 129 of the gooseneck section 120. As a result, the velocity of the air flow may remain substantially constant as the air flow flows through the curved portion 124. However, in other embodiments, the third cross-sectional flow area 128 may increase or decrease along the curved portion 124. In other words, the third cross-sectional flow area 128 may converge (e.g., decrease) from the first gooseneck end 122 to the second gooseneck end 126. Additionally, the third cross-sectional flow area 128 may diverge (e.g., increase) from the first gooseneck end 122 to the second gooseneck end 126.

In the illustrated embodiment, the second gooseneck end 126 is positioned proximate and fluidly coupled to a second diffuser 130 (e.g., second annular diffuser). In embodiments where the combustor 12 is an annular combustor, the second diffuser 130 is formed by the inner architecture annular wall 116 and the outer architecture annular wall 118. The second diffuser 130 is configured to receive the air flow from the gooseneck section 120 and enable expansion and/or mixing of the air flow in substantially the upstream direction 62. As shown, the second diffuser 130 is disposed circumferentially about the head end section 16 of the combustor 12. In other words, the second diffuser 130 may comprise an annular cavity about the head end section 16 to enable expansion of the air flow. To this end, expansion may facilitate mixing of the air flow as the air flow is directed in the upstream direction 62. Moreover, in other embodiments, the second diffuser 130 may decrease the velocity of the air flow (e.g., by increasing the cross-sectional flow area). Furthermore, the second diffuser 130 may reduce the possibility of flow separation by enabling expansion of the air flow in the upstream direction 62. As will be appreciated, in certain embodiments, the first and second diffusers 100, 130 may be incorporated into the pre-diffuser 96. That is, the pre-diffuser 96 may include the first diffuser 100, gooseneck section 120, and the second diffuser 130 to reduce the possibility of flow separation and prepare the air flow for mixing with fuel in the fuel nozzles 20. However, in other embodiments, the pre-diffuser 96 may include only the first diffuser 100 and the gooseneck section 120.

As shown in FIG. 2, an annular baffle 132 is positioned circumferentially about the combustion chamber 22 proximate the head end section 16. For example, the annular baffle 132 extends circumferentially about the combustor axis 92 of the combustion section 18. In the illustrated embodiment, the annular baffle 132 is configured to align with the second wall 60 and the first wall 58 to direct at least a portion of the air flow into a gap 134 (e.g., an annular gap) between the first and second walls 58, 60. As will be described below, the annular baffle 132 may be configured to direct at least a portion of the air flow into the gap 134 to cool first and second walls 58, 60. For example, the annular baffle 132 may include a scoop 136 configured to extend into the second diffuser 130 and/or the gooseneck section 120 to redirect at least a portion of the air flow toward the gap 134 via windows 138. For example, the scoop 136 may form a cavity or gap between the scoop 136 and the second wall 60. As shown in the illustrated embodiment, the scoop 136 is positioned in a generally upstream direction 62 to receive the air flow as the air flow travels in the upstream direction 62. As a result, the scoop 136 is configured to turn and/or direct the air flow toward the window 138. While the annular baffle 132 is positioned proximate the second gooseneck end 126 of the gooseneck section 120 in the illustrated embodiment, in other embodiments the annular baffle 132 may be positioned proximate the curved portion 124, within the second diffuser 130, or at any other suitable location to facilitate cooling of the combustion chamber 22.

In the illustrated embodiment, a settling chamber 140 receives the air flow from the second diffuser 130. As shown, the settling chamber 140 extends a first axial distance 142 in the direction 62. The first axial distance 142 is configured to position the settling chamber 140 a farther distance from the fuel nozzles 20 than the second diffuser 130. Accordingly, the combustor axial length 70 may be extended due to the settling chamber 140. The settling chamber 140 is configured to reduce the possibility of flow separation by facilitating mixing and stabilization of the air flow before the air flow enters the fuel nozzles 20. For example, the air flow may enter the settling chamber 140 before being directed toward the fuel nozzles 20. That is, the air flow may flow in the upstream direction 62 and turn to flow substantially perpendicular to the combustor axis 92 (e.g., radially relative to the combustor axis 92) in a crosswise direction. Moreover, the air flow may be directed to turn and flow in the downstream direction of combustion 64. As used herein, turn may be used to refer to changing the direction of the air flow by between 5 degrees and 180 degrees. In the illustrated embodiment, the settling chamber 140 is an annular cavity extending circumferentially about a holder 144 (e.g., fuel nozzle holder) coupled to the fuel nozzles 20. Moreover, in certain embodiments, the fuel nozzles 20 may be integrally formed with the holder 144. Additionally, in other embodiments, the settling chamber 140 is an annular cavity extending circumferentially about the combustor axis 92 or the longitudinal axis 50. As will be described below, in certain embodiments, the settling chamber 140 directs the air flow toward the holder 144 to facilitate mixing the air flow with the fuel 24. Moreover, in certain embodiments, 1, 2, 3, 4, 5, 10, 20, 30 or any suitable number of fuel nozzles 144 may be circumferentially spaced about the combustor 12 (e.g., about the longitudinal axis 50, about the combustor axis 92) to direct air and/or the fuel 24 toward the fuel nozzles 20.

Furthermore, as shown in FIG. 2, the second wall 60, 60b may include an arm 146 positioned in the downstream direction of combustion 64. For example, in embodiments where the combustor 12 is an annular combustor, the arm 146 may be coupled to the outer second wall 60b (e.g., outer flow path sleeve). As a result, the arm 146 may be configured to direct an air flow portion 148 toward the gap 134 between the outer first wall 58b and the outer second wall 60b to facilitate cooling of the first and second outer walls 58b, 60b. However, in embodiments where the combustor 12 is a can-annular combustor, the arm 146 may be coupled to the second wall 60. As a result, the arm 146 may be configured to direct the air flow portion 148 toward the gap 134 between the first wall 58 and the second wall 60 to facilitate cooling of the first and second walls 58, 60. In the illustrated embodiment, the arm 146 is an extension of the outer second wall 60b positioned proximate to the annular baffle 132. In certain embodiments, the arm 146 may extend circumferentially about the longitudinal axis 50. However, in other embodiments, the arm 146 may extend circumferentially about the combustor axis 92, thereby forming an annular passage to direct the air flow into the gap 134. Moreover, in certain embodiments, the scoop 136 may be positioned within the annular passage formed by the arm 146 and the outer first wall 58b.

Figure 3:
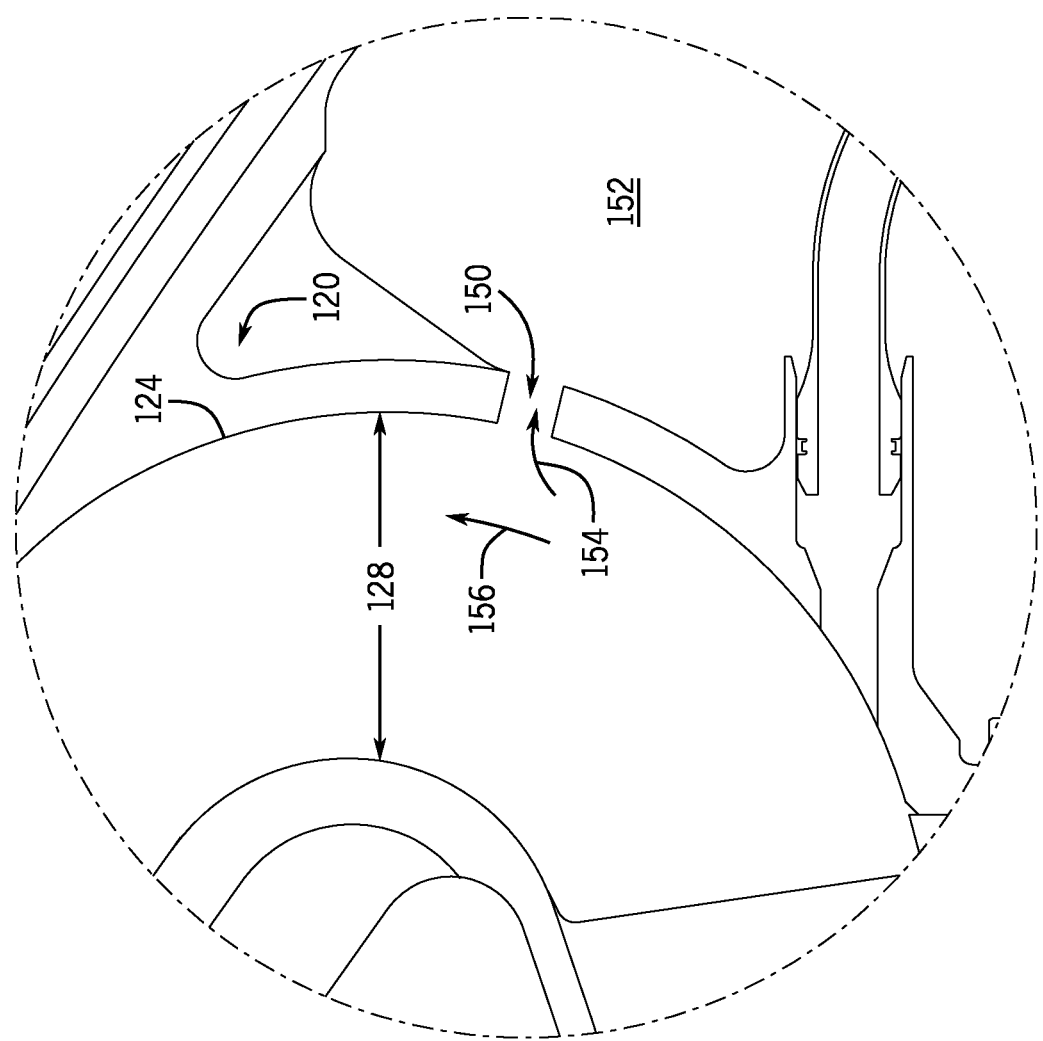
FIG. 3 is a schematic cross-sectional view of an embodiment of a gooseneck section, taken with line 3-3 of FIG. 2.

FIG. 3 is a schematic cross-sectional view of the gooseneck section 120 taken with line 3-3 of FIG. 2. As described above, the curved portion 124 has a substantially equal (e.g., a substantially constant circumference in the direction of flow) third cross-sectional flow area 128 to reduce the possibility of pressure drop as the air flow is directed toward the fuel nozzles 20. In the illustrated embodiment, the curved portion 124 includes one or more passages 150 fluidly coupled to a chamber 152 (e.g., annular chamber) positioned circumferentially about the combustion chamber 22. In certain embodiments, the one or more passages 150 may be spaced circumferentially about the annular curved portion 124 (e.g., circumferentially about the combustor axis 92, circumferentially about the longitudinal axis 50). The passage 150 is configured to receive at least a portion of the air flow, as represented by an arrow 154, while a remainder of the air flow, represented by an arrow 156, flows toward the second diffuser 130. The air flow 156 in the chamber 152 may energize the boundary layer (e.g., energize the air flowing over the low pressure side of the second wall 60) and/or relieve pressure build up in the curved portion 124, thereby enabling flow of the air flow to the fuel nozzles 20. In certain embodiments, the passage 150 may be an annular opening extending along the annular path of the curved portion 124. Moreover, in other embodiments, the one or more passages 150 may be equally spaced along the curved portion 124. As will be appreciated, the passage 150 may be generally circular in shape. Furthermore, in other embodiments, the passage 150 may be rectangular, ovular, arcuate, or any other suitable shape to enable the air flow 154 to enter the chamber 152.

Figure 4:
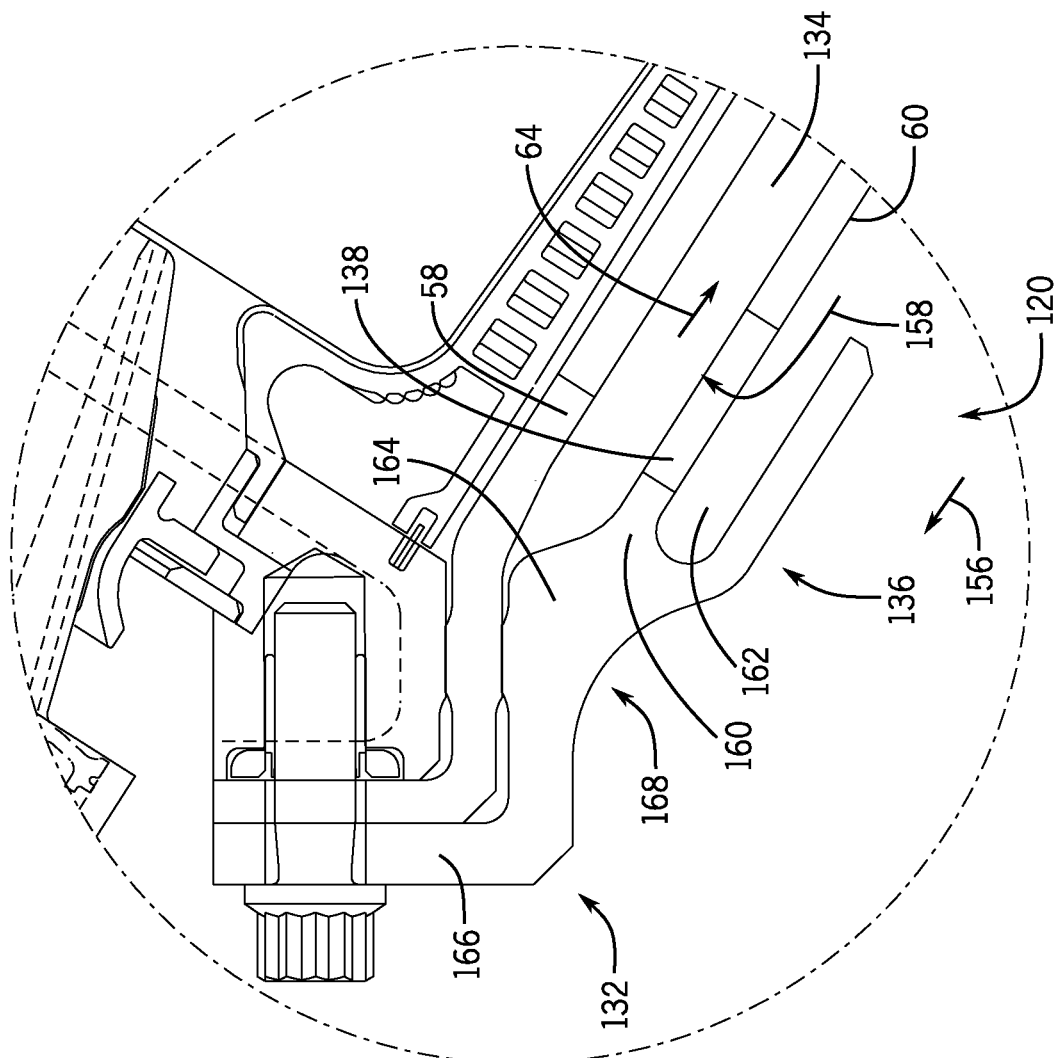
FIG. 4 is a schematic cross-sectional view of an embodiment of an annular baffle, taken with line 4-4 of FIG. 2.

FIG. 4 is a schematic cross-sectional view of the annular baffle 132, taken within the line 4-4 of FIG. 2. As described above, the scoop 136 is configured to protrude radially outward from the annular baffle 132 and into the gooseneck section 120. As a result, the scoop 136 captures and/or redirects at least a portion of the air flow 156, as represented by an arrow 158. The air flow 158 is directed toward the window 138 and into the gap 134. Furthermore, as the air flow 158 enters the gap 134, the air flow 158 is directed in the direction of combustion 64. In other words, the cooling air flow in the gap 134 is substantially opposite the direction of the air flow 156 flowing toward the fuel nozzles 20.

In the illustrated embodiment, the scoop 136 is radially spaced from a body portion 160 (e.g., annular body portion) to form a cavity 162 (e.g., annular cavity) to receive the air flow 158 before directing the air flow 158 toward the window 138 and into the gap 134. While the scoop 136 is substantially parallel to the wall 60 in the illustrated embodiment, in other embodiments the scoop 136 may be angled with respect to the wall 60. Moreover, the body portion 160 includes a ridge 164 (e.g., annular ridge) positioned downstream of the scoop 136 and the cavity 162. The ridge 164 is configured to bear against the first wall 58 and radially separate the body portion 160 from the first wall 58. Accordingly, the ridge 164 may be configured to form a substantially fluid tight seal against the first wall 58 to direct the air flow 158 in the downstream direction of combustion 64 along (and between) the walls 58 and 60. Furthermore, as shown in FIG. 4, the annular baffle 132 may include a flange or fastening body 166 (e.g., annular fastening body) positioned downstream of the ridge 164. The fastening body 166 is configured to couple to a corresponding surface of the first wall 58 (e.g., via a plurality of fasteners, adhesive, weld, braze, etc.) to rigidly couple the annular baffle 132 to the second wall 60. Furthermore, the annular baffle 132 includes an inwardly curved indentation 168 positioned opposite the ridge 164. The indentation 168 is configured to direct (e.g., turn) the air flow 156 to the second diffuser 130. In other words, the curved surface of the indentation 168 facilitates flow of the air flow 156 to the second diffuser 130.

As shown in FIG. 4, the scoop 136 is configured to overlap and/or extend about at least a portion of the second wall 60. For example, the scoop 136 may extend in the downstream direction of combustion 64 from the ridge 164. Moreover, the scoop 136 extends in the downstream direction of combustion 64 such that the scoop 136 overlaps the window 138, in the illustrated embodiment. As a result, the air flow 158 directed toward the cavity 162 is configured to turn and/or flow toward the window 138 and into the gap 134.

Figure 5:
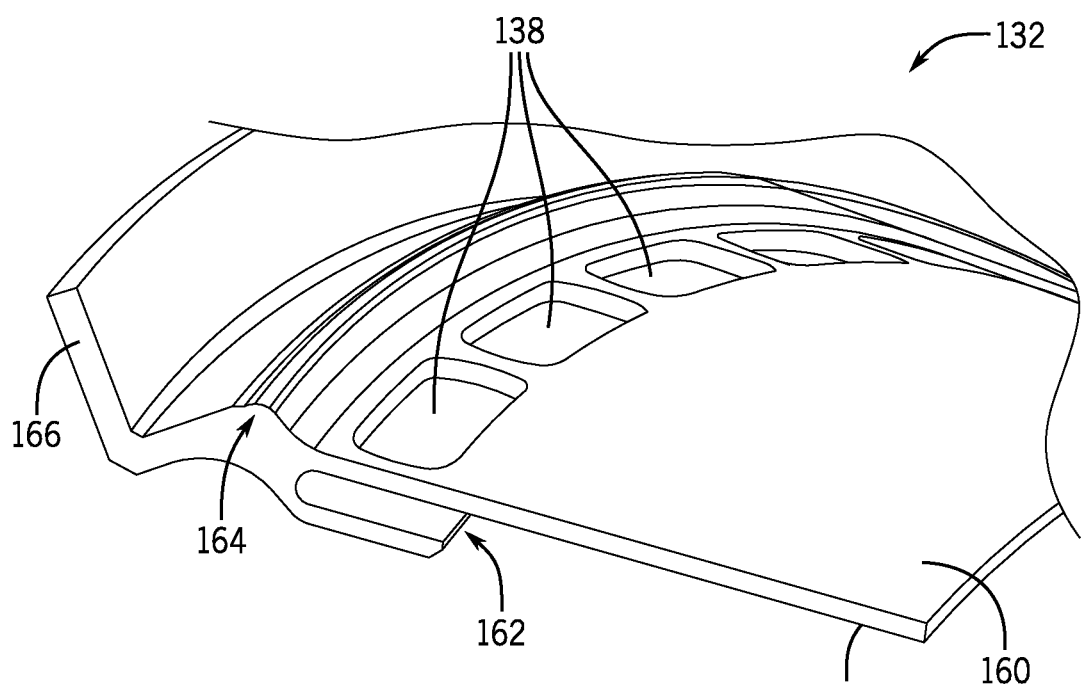
FIG. 5 is a partial perspective view of an embodiment of the annular baffle of FIG. 4.

FIG. 5 is a partial perspective view of the annular baffle 132. As described above, the windows 138 are configured to direct the air flow 158 into the gap 134. In the illustrated embodiment, the annular baffle 132 includes a plurality of windows 138 circumferentially spaced about the combustor axis 92. However, in embodiments where the combustor 12 is an annular combustor, the plurality of windows 138 may be circumferentially spaced about the longitudinal axis 50. In certain embodiments, the windows 138 (e.g., in wall 60) may be equally spaced along the annular baffle 132. However, in other embodiments, the windows 138 may be positioned such that more air flow 158 is directed toward particularly selected portions of the gap 134. For example, more windows 138 may be positioned on a downstream portion of combustion chamber 22. Moreover, in the illustrated embodiments, the windows 138 are substantially rectangular with rounded edges. However, in other embodiments, the windows 138 may be circular, oval, arcuate, polygonal, or any other suitable shape. Moreover, in certain embodiments, the windows 138 may not all be the same shape. For example, a portion of the windows 138 may be substantially rectangular, while another portion of the windows 138 are substantially arcuate. Accordingly, the size, shape, spacing, and number of windows 138 utilized to direct the air flow 158 toward the gap 134 may be particularly selected to accommodate operating conditions of the gas turbine system 10.

Figure 6:
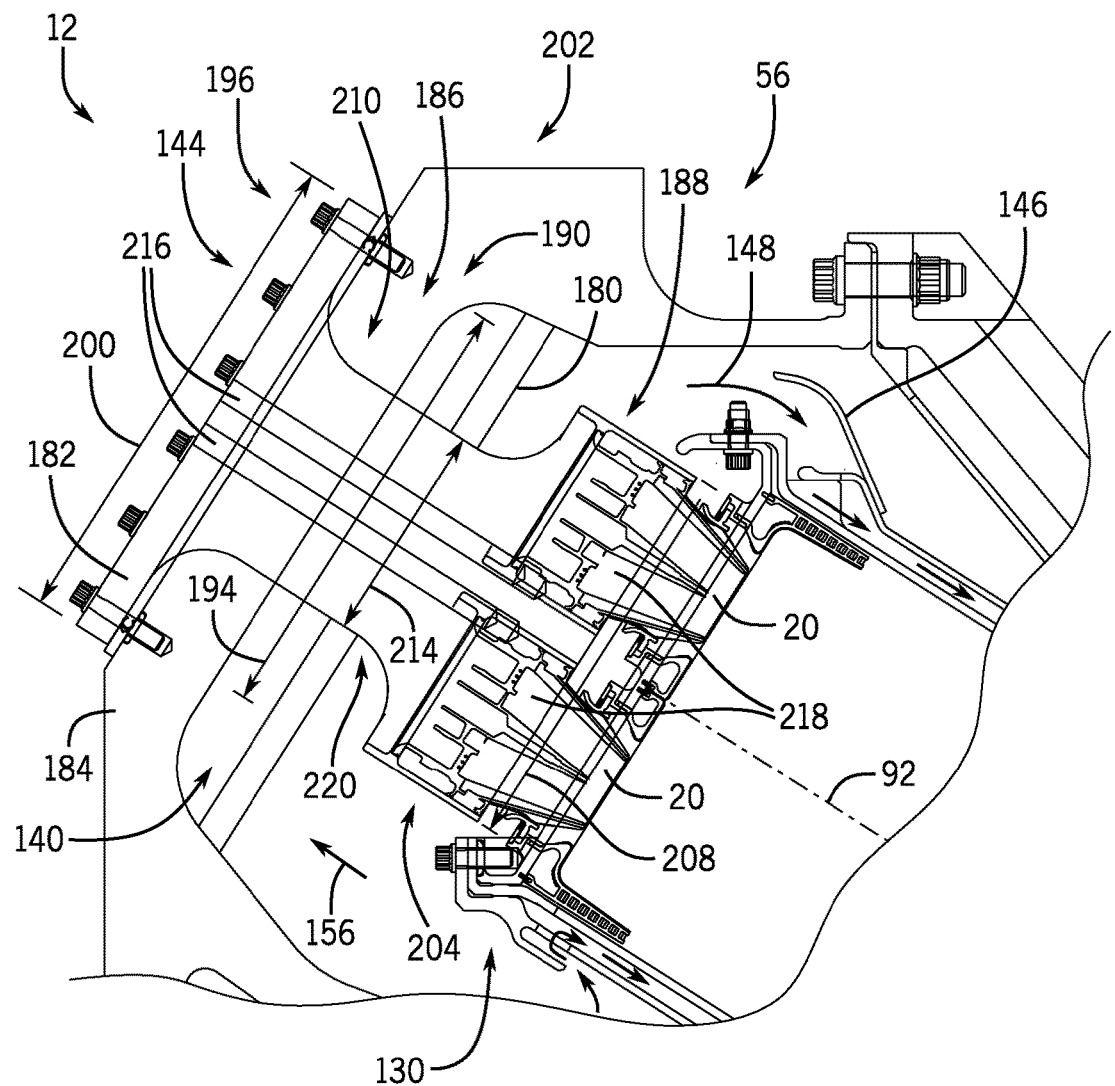
FIG. 6 is a schematic cross-sectional view of an embodiment of a settling chamber of the flow path architecture system of FIG. 2.

FIG. 6 is a schematic cross-sectional view of the settling chamber 140, taken within line 6-6 of FIG. 2. As described above, the settling chamber 140 may be an annular cavity positioned proximate the head end chamber 56 of the combustor 12. Moreover, the settling chamber 140 may be configured to enable mixing and/or settling of the air flow before entering the fuel nozzles 20. That is, the settling chamber 140 may be an elongated chamber configured to receive the air flow 156 from the second diffuser 130 before the air flow enters the fuel nozzles 20 and/or premixers to enable uniform distribution of the air flow. Accordingly, the possibility of flow separation and/or pressure drop may be reduced by increasing the duration of time the air flow 156 is in the flow architecture 14 before entering the fuel nozzles 20 and/or premixers. In the illustrated embodiment, the holder 144 is positioned within the settling chamber 140 and is substantially aligned with the combustor axis 92. In certain embodiments, the holder 144 may not be coaxial with the combustor axis 92. Moreover, in other embodiments, the holder 144 may be coaxial with the combustor axis 92. As shown, the holder 144 is coupled to the fuel nozzles 20 and/or premixers and extends through a flow separator 180. As will be described below, the flow separator 180 is an annular plate having openings which enable the holder 144 to extend through the flow separator 180. However, in other embodiments, the flow separator 180 may not be included and the holder 144 may couple directly to the fuel nozzles 20 and/or premixers. Furthermore, in certain embodiments, the fuel nozzles 20 are integrally formed with the holder 144. Moreover, in other embodiments, the holder 144 may couple directly to both the flow separator 180 and the fuel nozzles 20. As will be described below, the holder 144 may extend through openings in the flow separator 180 to couple to the fuel nozzles 20.

In the illustrated embodiment, the holder 144 includes a first end 182 (e.g., a mounting flange, a connector, a coupling, an enlarged end portion, etc.) coupled to a combustor housing 184 (e.g., via fasteners). In certain embodiments, the first end 182 includes a body portion having openings that enable the first end 182 to receive the fuel nozzles 20 and/or premixers. Moreover, the combustor housing 184 may include an opening 186 configured to receive the holder 144. To that end, the holder 144 may be removable and/or replaceable. That is, the holder 144 may be configured to removably receive and/or mount the fuel nozzles 20 and/or premixers. However, as described above, in other embodiments the holder 144 may be integrally formed with the fuel nozzles 20 and/or premixers. In certain embodiments, an operator may remove the holder 144 from the settling chamber 140 by decoupling the first end 182 from the combustor housing 184 and lifting a second end 188 (e.g., a receptacle, a fuel nozzle connector, an enlarged end portion) of the holder 144 through the opening 186. The opening 186 may comprise an opening area 190 formed by a first opening dimension or length 192 (e.g., extending into or perpendicular to the page) and a second opening dimension or width 194. The first opening dimension 192 may be greater than the second opening dimension 194, such as 1.5 to 10, 2 to 8, or 3 to 5 times the second opening dimension 194. To facilitate coupling of the first end 182 to the combustor housing 184, a first end area 196 may be larger than the opening area 190. In other words, a first end dimension or width 198 (e.g., extending into or perpendicular to the page) and a first end dimension or length 200 may be larger than the first opening dimension 192 and the second opening dimension 194 such that the first end 182 contacts the combustor housing 184 while the holder 144 is in an installed position 202. Furthermore, the opening area 190 may be larger than a second end area 204. That is, a second end dimension or length 206 (e.g., extending into or perpendicular to the page) and a second end dimension or width 208 comprising the second end area 204 may be smaller than the opening area 190 (e.g., smaller than the first opening dimension 192 and the second opening dimension 194) to enable the second end 188 of the holder 144 to pass through the opening 186 during installation. As such, the holder 144 may be a removable component that may be replaced based on the operating conditions of the gas turbine system 10. For example, as will be described below, the holder 144 may be changed to accommodate different fuel types, different air/fuel mixtures, or the like.

As shown in FIG. 6, the holder 144 includes a neck portion 210 coupling the first end 182 to the second end 188. As such, the holder 144 may be substantially H-shaped or I-shaped. A first neck dimension or width 212 (see FIG. 8) and a second neck dimension or length 214 are configured to be smaller than the first end dimension 198 and the first end dimension 200 to enable installation of the holder 144 through the opening 186. Additionally, in the illustrated embodiment, the second neck dimension 214 is smaller than the second end dimension 208. For example, the second neck dimension 214 may be 1.1 to 10, 1.2 to 5, 1.3 to 3, or 1.5 to 2 times smaller than the first end dimension 198 and/or the second end dimension 208. As a result, installation and the removal of the holder 144 may be done through the opening 186. Moreover, in certain embodiments, the first and second neck dimensions 212, 214 may be particularly selected to enable and/or block removal of the holder 144 from the opening 186. For example, the holder 144 may be inserted through the opening 186 and then rotated (e.g., approximately 90 degrees) such that removal of the holder 144 from the opening 186 is blocked until the holder 144 is rotated again.

As described above, the holder 144 is configured to direct the fuel 24 to the fuel nozzles 20 and to facilitate mixing of the air flow and the fuel 24. For example, in the illustrated embodiment, the holder 144 includes fuel passages 216 extending from the first end 182, through the neck portion 210, to the second end 188, and into the fuel nozzles 20 and/or premixers. In certain embodiments, the fuel path 26 may couple to the fuel passages 216 to enable injection of the fuel 24 into the fuel nozzles 20 and/or premixers for combustion within the combustion chamber 22. As will be described below, the fuel passages 216 may direct to the fuel 24 to a premixing area 218 (e.g., annular premixing area) to enable the fuel 24 and the air flow to combine before entering the fuel nozzles 20.

In the illustrated embodiment, the flow separator 180 is positioned within the settling chamber 140. Moreover, the flow separator 180 may include apertures 220 to enable the holder 144 to extend through the flow separator 180 and couple to the fuel nozzles 20 and/or premixers. Furthermore, the flow separator 180 may couple directly to the holder 144, thereby securing the holder 144 to the fuel nozzles 20 and/or premixers. For example, the flow separator 180 may include a latching coupling that couples to the first end 182, the neck portion 210, and/or the second end 188.

Figure 7:
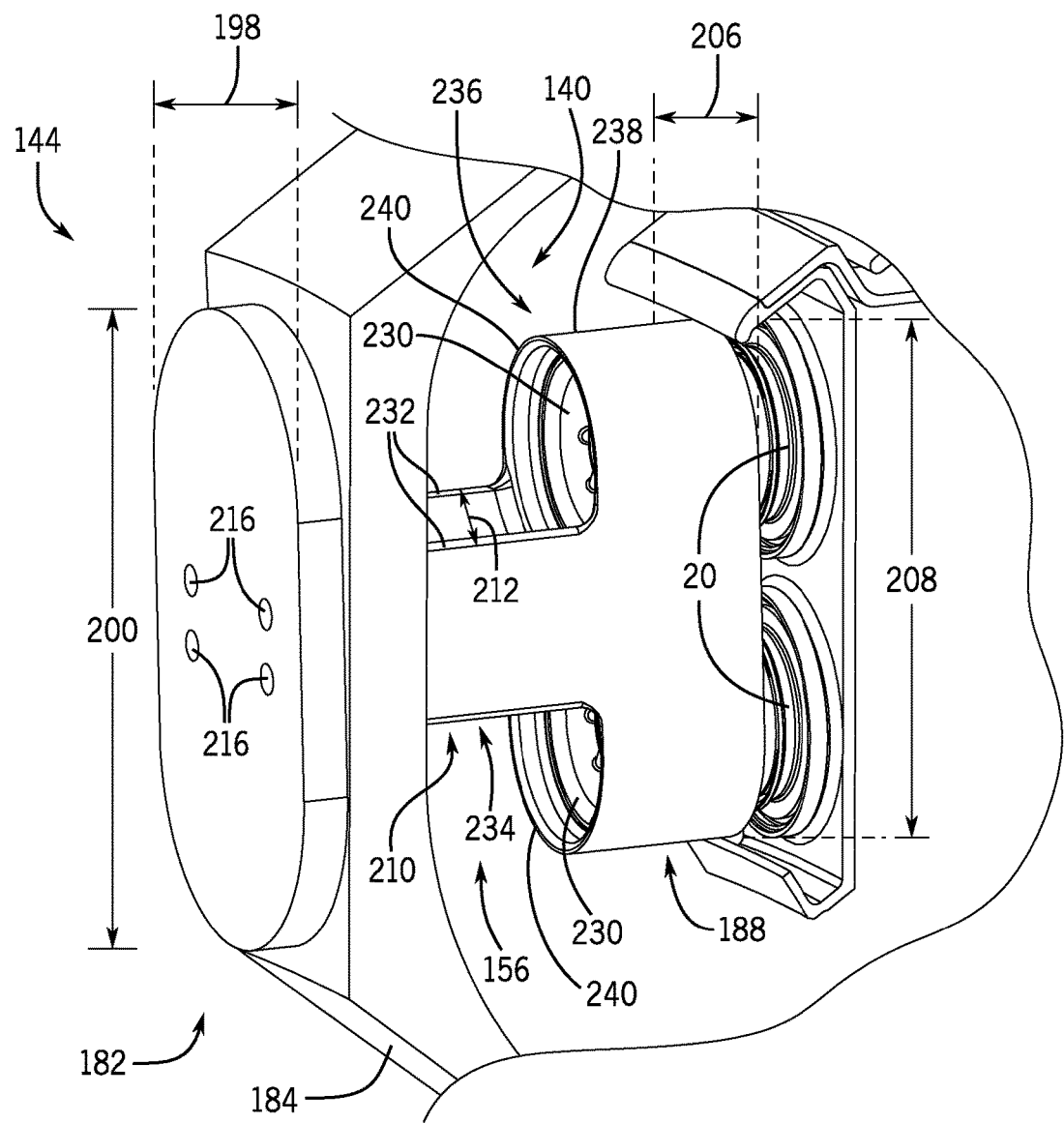
FIG. 7 is a partial perspective view of an embodiment of an axial premixer of FIG. 1, in which the axial premixer is coupled to fuel nozzles and a combustor housing.

FIG. 7 is a partial perspective view of the holder 144 coupled to the fuel nozzles 20 and/or premixers. As described above, the holder 144 includes the first end 182 coupled to the combustor housing 184. Moreover, the neck portion 210 extends from the first end 182 to the second end 188. As shown, the second end 188 is coupled to the fuel nozzles 20 and substantially surrounds the fuel nozzles 20 and/or premixers. In the illustrated embodiment, the fuel passages 216 extend from the first end 182 to the second end 188, thereby enabling the fuel 24 to enter the fuel nozzles 20 and/or premixers. In certain embodiments, the fuel passages 216 may direct the same or different types of fuels (e.g., liquid and/or gaseous fuels) to the fuel nozzles 20 and/or premixers. While the illustrated embodiment includes four fuel passages 216, in other embodiments there may be more or fewer fuel passages 216. For example, there may be 1, 2, 3, 5, 6, 7, 8, 9, 10, or any suitable number of fuel passages 216.

During operation, the holder 144 is configured to direct the fuel 24 to the fuel nozzles 20 for mixing with at least a portion of the air flow 156. In certain embodiments, the holder 144 may facilitate mixing of the fuel 24 and the air flow 156 by directing the air flow 156 to flow passages 230 on the fuel nozzles 20. For example, the neck portion 210 may include stems 232 which are offset or separated by a gap or void 234 (e.g., intermediate passage). In other words, the stems 232 are spaced apart from one another, and may be parallel, converging, or diverging relative to one another. In certain embodiments, the stems 232 may be cambered (e.g., curved, bowed, angled) or aerodynamically shaped to facilitate flow of the air flow 156 to the flow passages 230. For example, each stem 232 may have an airfoil shaped cross-section (e.g., a curved outer perimeter) extending between ends 182 and 188. Accordingly, the air flow 156 entering the settling chamber 140 may be directed toward the flow passages 230 as the air flow 156 encounters the stems 232. Moreover, while the illustrated embodiment includes two stems 232, in other embodiments, there may be 1, 3, 4, 5, 6, 7, 8, 9, 10, or any suitable number of stems 232 forming the neck portion 210.

In the illustrated embodiment, the second end 188 includes fuel nozzle connectors 236 to couple the holder 144 to the fuel nozzles 20. As shown, the fuel nozzle connectors 236 include a shell 238 having apertures 240 (e.g., cylindrical bores, receptacles) to receive the fuel nozzles 20. In certain embodiments, the shell 238 and/or the apertures 240 may include locking mechanisms to rigidly couple the second end 188 to the fuel nozzles 20. For example, the locking mechanisms may be tongue and groove connectors, interference connectors, threaded fasteners or the like.

Accordingly, the holder 144 may be installed through the opening 186 and coupled to the fuel nozzles 20 via the fuel nozzle connectors 236.

Figure 8:
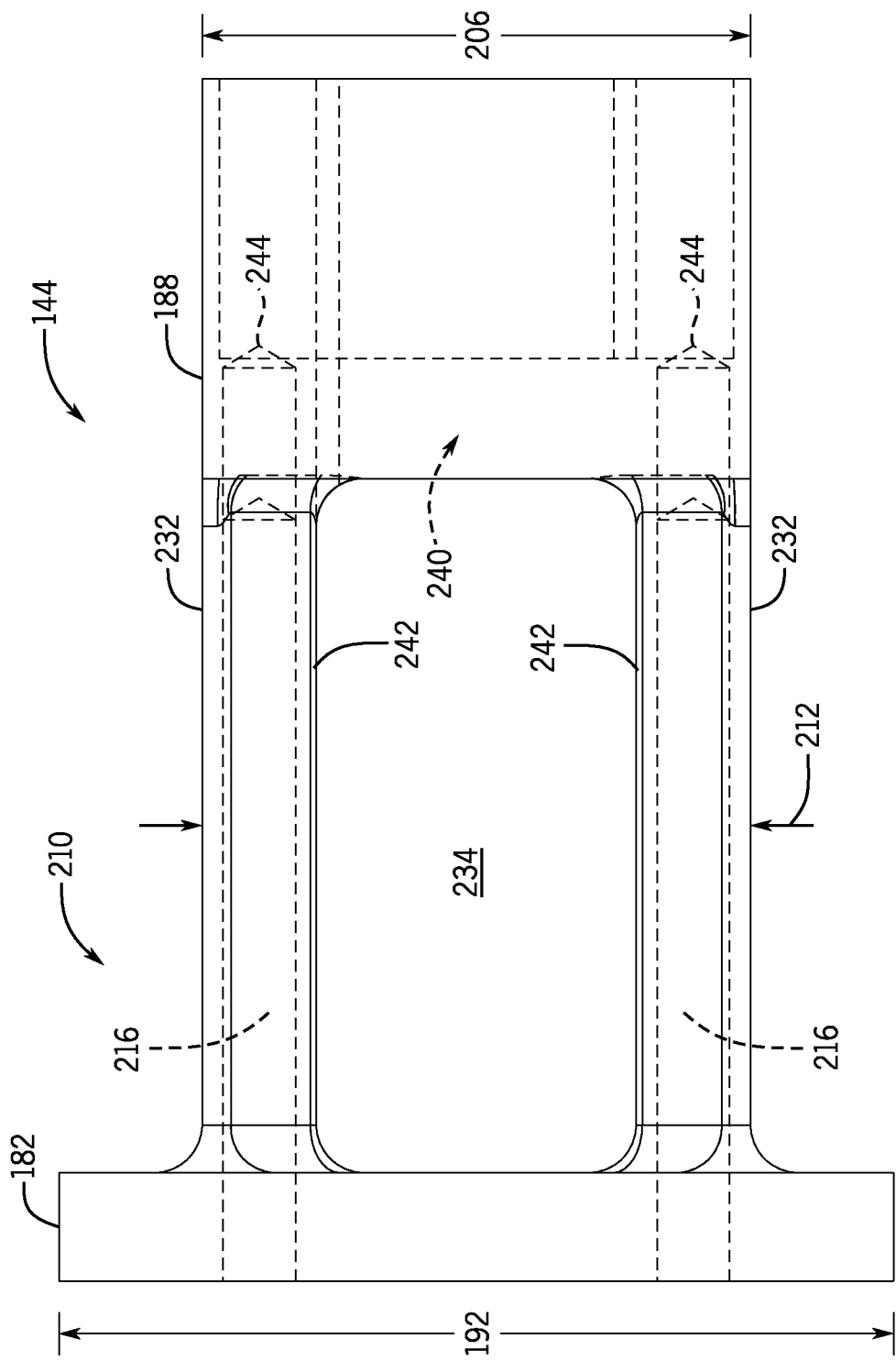
FIG. 8 is a schematic top view of an embodiment of the axial premixer of FIG. 7.

FIG. 8 is a schematic top view of an embodiment of the holder 144. As described above, the first end 182 is coupled to the second end 188 via the neck portion 210. In the illustrated embodiment, the neck portion 210 includes the stems 232 having the cambered or aerodynamic shape (e.g., airfoil shaped cross-section). In other words, the stems 232 include a curved edge 242 (e.g., the perimeter of the airfoil shaped cross-section) configured to facilitate flow through the void 234 and to the fuel nozzles 20 and/or premixers. In certain embodiments, the aerodynamic shape may include a curved perimeter having opposite edges and opposite curved sides. As a result, the air flow 156 may interact with the curved edge 242 and be directed to the fuel nozzles 20 and/or premixers. Moreover, in the illustrated embodiment, the fuel passages 216 extend from the first end 182 to the second end 188 to outlets 244 positioned in the apertures 240. The outlets 244 may be configured to inject the fuel 24 into the fuel nozzles 20 and/or premixers to enable combustion within the combustion chamber 22.

As mentioned above the first end dimension 198 (FIG. 7) is larger than the second end dimension 206 (FIG. 7) and the first neck dimension 212 (FIG. 7), in the illustrated embodiment. Accordingly, the first end 182 may be configured to couple to the combustor housing 184 while the second end 188 and the neck portion 210 extend through the opening 186 to enable the holder 144 to couple to the fuel nozzles 20. Moreover, while the illustrated embodiment includes the second end width 206 substantially equal to the first neck dimension 212, in other embodiments, the second end dimension 206 may be larger than the first neck dimension 212, or the second end dimension 206 may be smaller than the first neck dimension 212. Moreover, in the illustrated embodiment, the stems 232 are substantially parallel. However, in other embodiments, the stems 232 may be diverging or converging. Moreover, the fuel passages 216 may be diverging or converging toward the second end 188.

Figure 9:
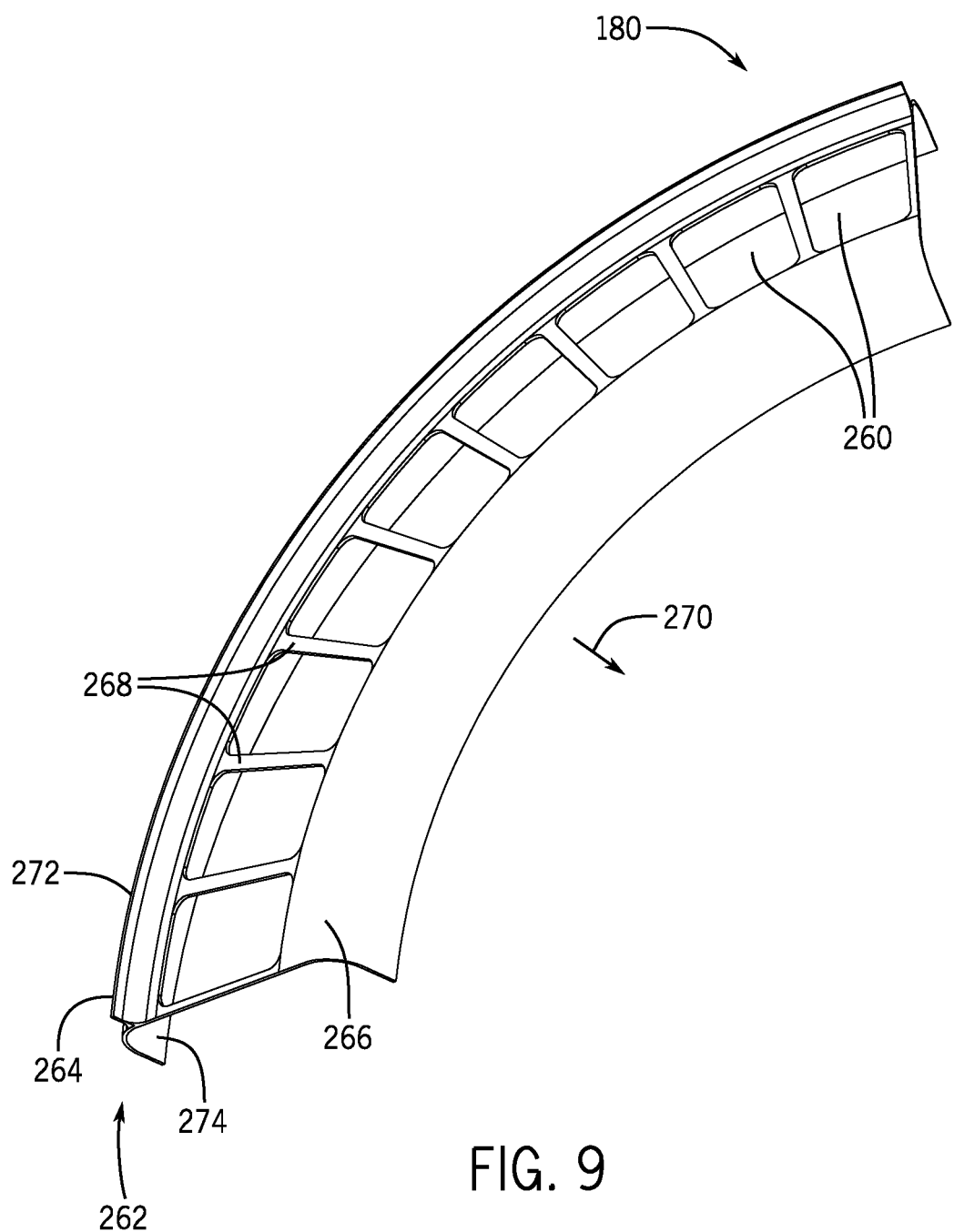
FIG. 9 is a partial perspective view of an embodiment of a flow separator of the flow path architecture system of FIG. 2.

FIG. 9 is a partial perspective view of an embodiment of the flow separator 180. As described above, the flow separator 180 is configured to mount to the combustor housing 184 and extend circumferentially about the combustor axis 92. In certain embodiments, the flow separator 180 may extend circumferentially about the longitudinal axis 50. Moreover, in certain embodiments, the flow separator 180 may be positioned within the settling chamber 140. In the illustrated embodiment, the flow separator 180 includes slots 260 circumferentially spaced about the combustor axis 92. However, as described above, in certain embodiments the combustor 12 may be an annular combustor where the slots 260 are circumferentially spaced about the longitudinal axis 50. The slots 260 may be formed in a flow separator housing 262, which includes a coupling sleeve 264 (e.g., annular coupling sleeve) and a hub 266 (e.g., annular hub). The slots 260 are formed in the hub 266 and separated by arms 268 extending radially from an axial flow path 270 to the separator housing 262. In certain embodiments, the axial flow path 270 directs flow toward the flow passages 230 of the fuel nozzles 20 and/or premixers. In certain embodiments, the axial premixers 144 may be configured to extend through the slots 260 to couple to the fuel nozzles 20. For example, the stems 232 may extend through the slots 260 such that a gap is positioned about the stems 232. In certain embodiments, the slots 260 may be configured to facilitate common and/or uniform flow to the axial premixers 144. That is, the slots 260 may redirect the air flow 156 in the settling chamber 140 toward the axial premixers 144. In the illustrated embodiment, the coupling sleeve 264 includes a first lip 272 (e.g., first annular lip) and a second lip 274 (e.g., second annular lip) configured to engage the combustor housing 184 to position the flow separator 180 within the settling chamber 140. As shown, the first and second lips 272, 274 include curved edges configured to flex and/or deform in response to the pressure of the air flow 156 within the settling chamber 140. Moreover, the first and second lips 272, 274 may be configured to form a substantially fluid tight seal between the flow separator 180 and the combustor housing 184, thereby directing the air flow 156 through the slots 260 and/or along the axial flow path 270.

Figure 10:
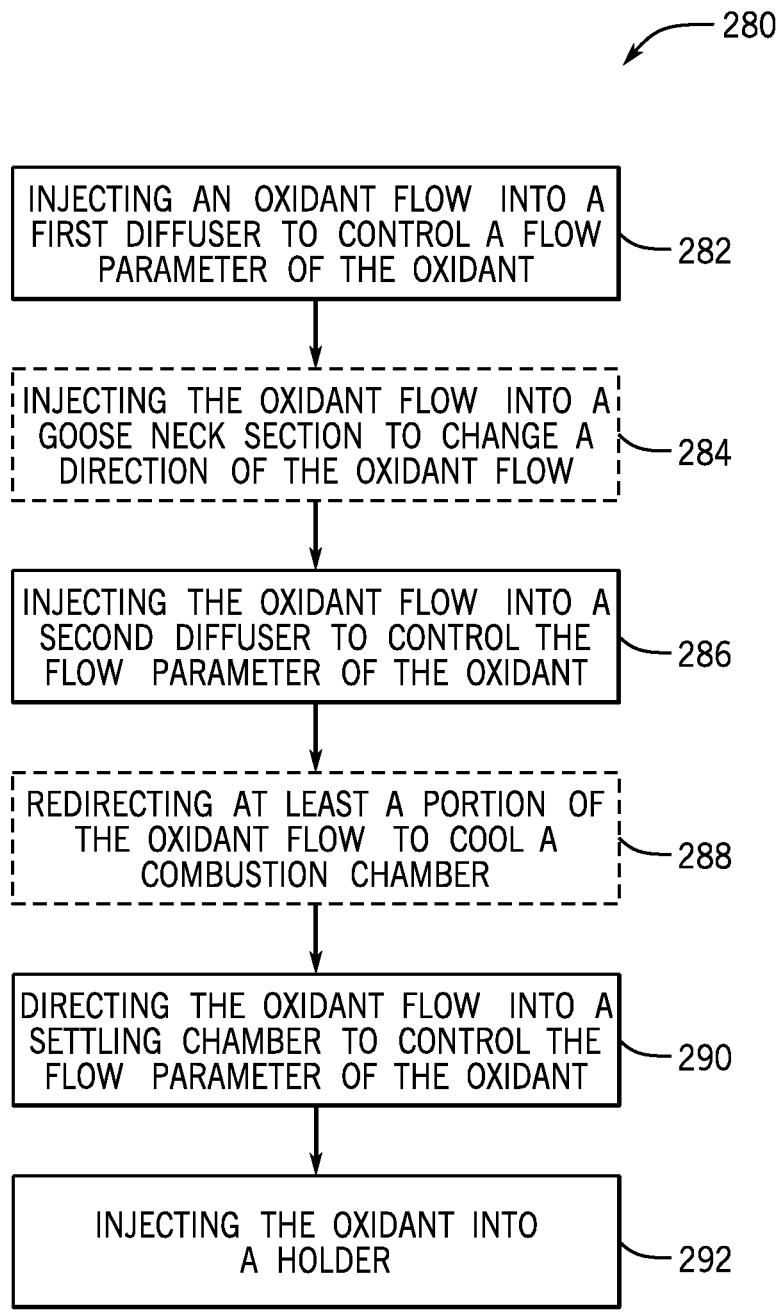
FIG. 10 is a flow chart of an embodiment of a method of operation of the gas turbine system of FIG. 1.

FIG. 10 is a flow chart of an embodiment of a method 280 of operation of the gas turbine system 10 utilizing the flow architecture 14. The air flow 156 may be injected into the first diffuser 100 (block 282). As described above, the cross-sectional flow area of the first diffuser 100 may increase along the first diffuser length 102, thereby controlling at least one parameter (e.g., velocity, pressure, mixing) of the air flow 156. For example, the first diffuser 100 may decrease the velocity of the air flow 156 and/or control the pressure of the air flow 156. In certain embodiments, the air flow 156 subsequently enters the gooseneck section 120 (block 284). For example, the gooseneck section 120 may include the curved portion 124 configured to redirect the air flow 156 (e.g., change the direction of flow). By redirecting the air flow 156, the air flow 156 may flow in the direction 62, substantially opposite the direction of combustion 64 to enable counter flow cooling of the combustion chamber 22. Furthermore, the air flow 156 may be subsequently injected into the second diffuser 130 (block 286). In certain embodiments, the second diffuser 130 is configured to reduce the possibility of flow separation in the air flow 156. For example, the second diffuser 130 may have a larger cross-sectional flow area than the curved portion 124, thereby reducing the velocity of the air flow 156 and controlling the at least one parameter of the air flow 156. However, in other embodiments, the second diffuser 130 may control other parameters of the air flow 156 (e.g., pressure or mixing).

In certain embodiments, at least a portion of the air flow 156 is redirected to cool the combustion chamber 22 (block 288). For example, the annular baffle 132 (e.g., the scoop 136) may extend into the second diffuser 130 to redirect the air flow 158 into the gap 134 via the window 138. As will be appreciated, the gap 134 may direct the air flow 158 to flow in the direction of combustion 64 and facilitate co-current flow cooling of the walls 58, 60. The remainder of the air flow 156 is directed toward the settling chamber 140 (block 290). In certain embodiments, the settling chamber 140 is positioned upstream of the fuel nozzles 20 and/or premixers and enables the air flow 156 to mix and obtain a substantially uniform velocity before being directed toward the fuel nozzles 20 and/or premixers (block 292). The fuel nozzles 20 may be configured to receive the air flow 156 and facilitate mixing of the air flow 156 with the fuel 24 to enable combustion within the combustion chamber 22. Accordingly, the flow architecture 14 may be utilized during operation of the gas turbine system 10 to enable multiple stages of diffusion of the air flow 156 from the air intake 36 to substantially reduce pressure drop, reduce the velocity, or the like as the air flow 156 is directed toward the fuel nozzles 20 and/or premixers.

Figure 11:
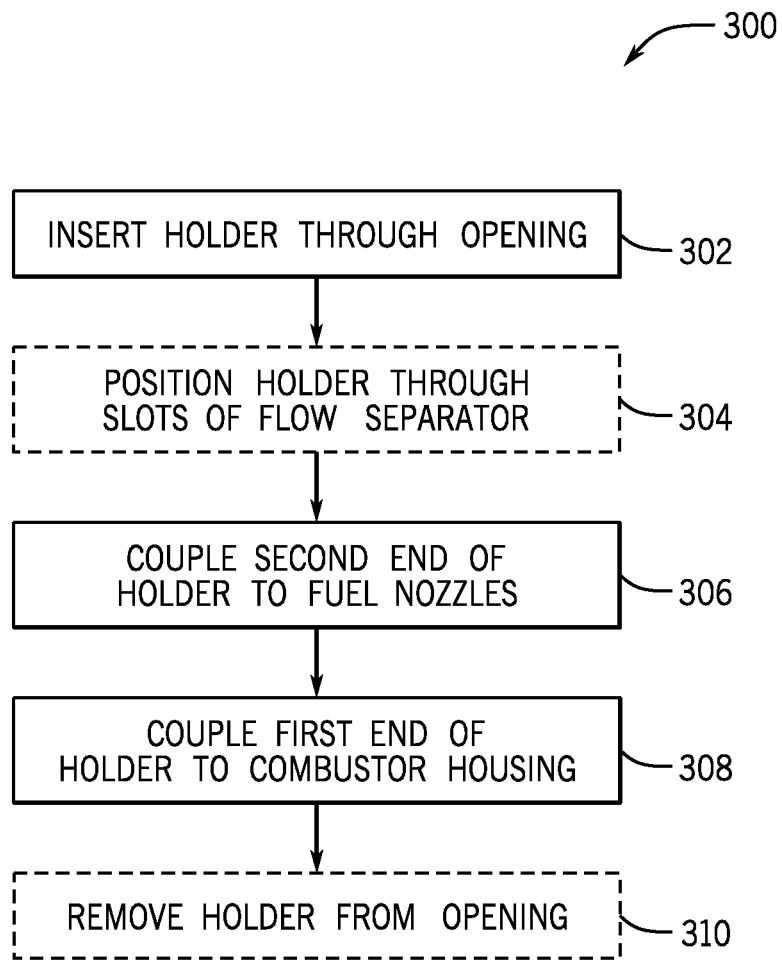
FIG. 11 is a flow chart of an embodiment of a method of installation of the axial premixer of FIG. 7.

FIG. 11 is a flow chart of an embodiment of a method 300 for installation of the holder 144. The holder 144 is inserted through the opening 186 of the combustor housing 184 (block 302). As described above, the second end 188 of the holder 144 is smaller than the opening 186 (e.g., the second end 188 is sized such that the second end 188 may pass through the opening 186). Accordingly, the holder 144 may be installed and/or removed from the combustor housing 184 without dismantling the combustor housing 184. In certain embodiments, the second end 188 of the holder 144 extends through the slots 260 of the flow separator 180 (block 304). For example, the flow separator 180 may be positioned within the settling chamber 140, such that the slots 260 are substantially aligned with the fuel nozzles 20 and/or premixers. The second end 88 of the holder 144 is coupled to the fuel nozzles 20 and/or premixers (block 306). In certain embodiments, the second end 188 may include the latching mechanism to rigidly couple the second end 188 to the fuel nozzles 20 and/or premixers. By coupling the second end 188 to the fuel nozzles 20 and/or premixers, the fuel passages 216 extending through the holder 144 may be fluidly coupled to the fuel nozzles 20, thereby enabling fuel to enter the combustion chamber 22. The first end 182 of the holder 144 is coupled to the combustor housing 184 (block 308). As described above, the first end 182 may have a larger area than the opening 186, thereby enabling the first end 182 to rigidly couple to the combustor housing 184. The holder 144 may be removed from the opening 186 (block 310). For example, the first end 182 may be uncoupled from the combustor housing 184 while the second end 188 is uncoupled from the fuel nozzles 20. Thereafter, the holder 144 may be removed from the opening 186. As a result, the holder 144 may be installed and/or removed from the combustor housing 184 without dismantling the combustor 12.

As described in detail above, the flow architecture 14 may be utilized to direct the air flow 156 to the fuel nozzles 20 and/or premixers. The air flow 156 may enter the first diffuser 100 for conditioning and/or control of at least one flow parameter. Moreover, the air flow 156 may be redirected through the gooseneck section 120. In certain embodiments, the air flow 156 enters the second diffuser 130 to further condition the at least one flow parameter. Moreover, at least a portion of the air flow 156 may be redirected to the gap 134 via the window 138 in the annular baffle 132. The air flow 158 in the gap 134 may be utilized to cool the walls 58, 60. The air flow 156 may flow through the second diffuser 130 to the settling chamber 140. In certain embodiments, the settling chamber 140 is configured to condition the at least one flow parameter of the air flow 156 to reduce pressure drop along the flow architecture 14 and/or provide uniform flow to the fuel nozzles 20. Moreover, as described above, the holder 144 may be positioned within the settling chamber 140. In certain embodiments, the holder 144 may include the fuel passages 216 to direct the fuel 24 toward the fuel nozzles 20 and/or premixers. Moreover, the holder 144 may include the stems 232 having the curved edges 242 to direct the air flow 156 toward the fuel nozzles 20. Accordingly, the air flow 156 may be directed to the fuel nozzles 20 and/or premixers with a substantially uniform pressure, velocity, and/or composition.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
 a combustor, comprising:
  a first multi-wall structure having a first liner wall disposed circumferentially about an axis, a first flow sleeve disposed along the first liner wall, and a first passage extending between the first liner wall and the first flow sleeve;
  a combustion chamber disposed circumferentially about the first liner wall; and
  a second multi-wall structure having a second liner wall disposed circumferentially about the combustion chamber, a second flow sleeve disposed along the second liner wall, and a second passage extending between the second liner wall and the second flow sleeve;
  wherein the combustor is configured to direct a combustion gas flow in a downstream direction through the combustion chamber away from a head end toward a turbine; and
 a supply passage configured to supply a fluid flow from a compressor to the combustion chamber, wherein the supply passage has a flow path architecture having a turning portion that turns the fluid flow from a compressor discharge direction to an upstream direction generally opposite the downstream direction of combustion gas flow, the flow path architecture directs at least a portion of the fluid flow into the first and second passages of the first and second multi-wall structures to flow in the downstream direction, the first multi-wall structure and the first passage extend in the downstream direction beyond the turning portion, the turning portion is stationary relative to the combustor, and the turning portion has a first curved wall along an inner radius and a second curved wall along an outer radius in a flow direction of the fluid flow, wherein the second curved wall includes a downstream curved portion directly connected to the first flow sleeve for directing the fluid flow in the upstream direction downstream of the turning portion.

2. The system of claim 1, wherein the turning portion comprises a substantially constant cross-sectional flow area for a distance in the flow direction of the fluid flow.

3. The system of claim 2, wherein the turning portion has a diverging cross-sectional flow area for a second distance in the flow direction of the fluid flow.

4. The system of claim 1, wherein the turning portion comprises a bypass opening disposed in the second curved wall along the supply passage, the bypass opening is disposed between an upstream curved portion and the downstream curved portion of the second curved wall, and the bypass opening is configured to route a bypass portion of the fluid flow to a chamber about the combustor.

5. The system of claim 1, comprising a baffle having a scoop adjacent a window, wherein the scoop extends into the supply passage, the scoop is configured to capture the portion of the fluid flow that flows in the upstream direction, the window is in fluid communication with the first passage, and the baffle is configured to redirect the portion of the fluid flow through the first passage in the downstream direction.

6. The system of claim 1, comprising at least one of:
 a first diffuser positioned upstream of the turning portion, wherein the first diffuser has a first cross-sectional flow area that increases in a flow direction of the fluid flow; or a second diffuser positioned downstream of the turning portion, wherein the second diffuser has a second cross-sectional flow area that increases in the flow direction of the fluid flow.

7. The system of claim 6, comprising the first and second diffusers.

8. The system of claim 1, comprising a settling chamber upstream of a fuel nozzle of the combustor, wherein the settling chamber is configured to receive the fluid flow and to control at least one parameter of the fluid flow before directing the fluid flow to the fuel nozzle.

9. The system of claim 8, comprising a flow separator positioned within the settling chamber, wherein the flow separator comprises slots configured to direct the fluid flow to the fuel nozzle.

10. A system comprising:
a combustor having a combustion chamber disposed circumferentially about an axis, wherein the combustor is configured to direct a combustion gas flow in a downstream direction through the combustion chamber away from a head end toward a turbine, wherein the combustor comprises a first multi-wall structure having a first liner wall disposed along the combustion chamber, a first flow sleeve disposed along the first liner wall, and a first passage extending between the first liner wall and the first flow sleeve;
a supply passage configured to supply a fluid flow from a compressor to the combustion chamber, wherein the supply passage has a flow path architecture having a turning portion that turns the fluid flow from a compressor discharge direction to an upstream direction generally opposite the downstream direction of combustion gas flow, the flow path architecture directs at least a portion of the fluid flow into the first passage of the first multi-wall structure to flow in the downstream direction, the first multi-wall structure and the first passage extend in the downstream direction beyond the turning portion, the turning portion is stationary relative to the combustor, and the turning portion has a first curved wall along an inner radius and a second curved wall along an outer radius in a flow direction of the fluid flow, wherein the second curved wall includes a downstream curved portion directly connected to the first flow sleeve for directing the fluid flow in the upstream direction downstream of the turning portion.

11. The system of claim 10, wherein the turning portion comprises a substantially constant cross-sectional flow area for a distance in the flow direction of the fluid flow.

12. The system of claim 11, wherein the turning portion comprises a diverging cross-sectional flow area for a second distance in the flow direction of the fluid flow.

13. The system of claim 10, comprising a settling chamber upstream of a fuel nozzle of the combustor, wherein the settling chamber is configured to receive the fluid flow and to control at least one parameter of the fluid flow before directing the fluid flow to the fuel nozzle.

14. The system of claim 10, wherein the turning portion comprises a bypass opening disposed in the second curved wall along the supply passage, the bypass opening is disposed between an upstream curved portion and the downstream curved portion of the second curved wall, and the bypass opening is configured to route a bypass portion of the fluid flow to a chamber about the combustor.

15. The system of claim 10, comprising:
a baffle having a scoop adjacent to a window, wherein the scoop extends into the supply passage, the scoop is configured to capture the portion of the fluid flow that flows in the upstream direction, the window is in fluid communication with the first passage extending between the first liner wall and the first flow sleeve, and the baffle is configured to redirect the portion of the fluid flow through the first passage in the downstream direction.

16. The system of claim 13, wherein the portion of the fluid flow is a first portion, and the combustor comprises a second multi-wall structure having a second liner wall disposed along the combustion chamber, a second flow sleeve disposed along the second liner wall, and a second passage extending between the second liner wall and the second flow sleeve, and the system comprises:
a baffle having an arm adjacent to a window, wherein the arm is configured to capture at least a second portion of the fluid flow that flows in the downstream direction after flowing through the settling chamber, the window is in fluid communication with the second passage extending between the second liner wall and the second flow sleeve, and the arm is configured to direct the second portion of the fluid flow through the second passage in the downstream direction.

17. A system comprising:
a combustor, comprising:
a first multi-wall structure having a first liner wall disposed circumferentially about an axis, a first flow sleeve disposed along the first liner wall, and a first passage extending between the first liner wall and the first flow sleeve;
a combustion chamber disposed circumferentially about the first liner wall; and
a second multi-wall structure having a second liner wall disposed circumferentially about the combustion chamber, a second flow sleeve disposed along the second liner wall, and a second passage extending between the second liner wall and the second flow sleeve;
wherein the combustor is configured to direct a combustion gas flow in a downstream direction through the combustion chamber away from a head end toward a turbine; and
a supply passage configured to supply a fluid flow from a compressor to the combustion chamber, wherein the supply passage has a flow path architecture having a turning portion that turns the fluid flow from a compressor discharge direction to an upstream direction generally opposite the downstream direction of combustion gas flow, the flow path architecture directs at least a portion of the fluid flow into the first and second passages of the first and second multi-wall structures to flow in the downstream direction, the first multi-wall structure and the first passage extend in the downstream direction beyond the turning portion, the turning portion is stationary relative to the combustor, the turning portion has a first curved wall along an inner radius and a second curved wall along an outer radius in a flow direction of the fluid flow, the turning portion comprises a bypass opening disposed in the second curved wall along the supply passage, the bypass opening is disposed between upstream and downstream curved portions of the second curved wall, and the bypass opening is configured to route a bypass portion of the fluid flow to a chamber about the combustor.

18. A system comprising:
a combustor, comprising:
a first multi-wall structure having a first liner wall disposed circumferentially about an axis, a first flow sleeve disposed along the first liner wall, and a first passage extending between the first liner wall and the first flow sleeve;

a combustion chamber disposed circumferentially about the first liner wall; and a second multi-wall structure having a second liner wall disposed circumferentially about the combustion chamber, a second flow sleeve disposed along the second liner wall, and a second passage extending between the second liner wall and the second flow sleeve;

wherein the combustor is configured to direct a combustion gas flow in a downstream direction through the combustion chamber away from a head end toward a turbine; and a supply passage configured to supply a fluid flow from a compressor to the combustion chamber, wherein the supply passage has a flow path architecture having a turning portion that turns the fluid flow from a compressor discharge direction to an upstream direction generally opposite the downstream direction of combustion gas flow, the flow path architecture directs at least a portion of the fluid flow into the first and second passages of the first and second multi-wall structures to flow in the downstream direction, the first multi-wall structure and the first passage extend in the downstream direction beyond the turning portion, the turning portion is stationary relative to the combustor, and the turning portion has a first curved wall along an inner radius and a second curved wall along an outer radius in a flow direction of the fluid flow; and a baffle having a scoop adjacent a window, wherein the scoop extends into the supply passage, the scoop is configured to capture the portion of the fluid flow that flows in the upstream direction, the window is in fluid communication with the first passage, and the baffle is configured to redirect the portion of the fluid flow though the first passage in the downstream direction.

19. The system of claim 18, comprising an additional baffle having an arm adjacent to an additional window, wherein the additional window is in fluid communication with the second passage extending between the second liner wall and the second flow sleeve, and the arm is configured to direct the fluid flow through the second passage in the downstream direction.

20. The system of claim 19, wherein the baffle protrudes away from the first flow sleeve and extends in the downstream direction, and the additional baffle protrudes away from the second flow sleeve and extends in the upstream direction.

* * * * *